(12) United States Patent
Teitelbaum

(10) Patent No.: US 11,536,030 B2
(45) Date of Patent: Dec. 27, 2022

(54) COMPOSITE OPEN WEB BEAM-JOIST AND METHOD OF MANUFACTURE

(71) Applicant: B&H Solutions LLC, Brooklyn, NY (US)

(72) Inventor: Ernest Teitelbaum, Brooklyn, NY (US)

(*) Notice: Subject to any disclaimer, the term of this patent is extended or adjusted under 35 U.S.C. 154(b) by 0 days.

(21) Appl. No.: 17/702,932

(22) Filed: Mar. 24, 2022

(65) Prior Publication Data
US 2022/0213687 A1 Jul. 7, 2022

(51) Int. Cl.
| | | |
|---|---|---|
| *B21D 47/01* | (2006.01) | |
| *B23P 15/00* | (2006.01) | |
| *E04C 3/08* | (2006.01) | |
| *E04C 3/04* | (2006.01) | |

(52) U.S. Cl.
CPC .......... *E04C 3/08* (2013.01); *B21D 47/01* (2013.01); *B23P 15/00* (2013.01); *B23P 2700/11* (2013.01); *E04C 2003/0413* (2013.01); *E04C 2003/0434* (2013.01); *E04C 2003/0452* (2013.01); *Y10T 29/49625* (2015.01); *Y10T 29/49634* (2015.01)

(58) Field of Classification Search
CPC ...... B21D 47/01; B23P 15/00; B23P 2700/11; Y10T 29/49625; Y10T 29/49634
See application file for complete search history.

(56) References Cited

U.S. PATENT DOCUMENTS

| | | | | |
|---|---|---|---|---|
| 3,427,699 A | * | 2/1969 | Cape ................... | B23K 11/002 29/430 |
| 5,669,197 A | * | 9/1997 | Bodnar ................ | E04C 3/083 52/842 |
| 5,687,538 A | * | 11/1997 | Frobosilo ............ | E04C 3/07 52/847 |
| 5,852,908 A | * | 12/1998 | Nankin ................ | E04C 3/09 52/840 |
| 6,457,292 B1 | * | 10/2002 | Vrana .................. | E04C 3/292 411/467 |
| 6,460,310 B1 | * | 10/2002 | Ford .................... | E04C 3/14 52/837 |
| 6,745,537 B1 | | 6/2004 | Hamilton | |

(Continued)

FOREIGN PATENT DOCUMENTS

EP 0113972 A1 7/1984

*Primary Examiner* — Sarang Afzali
*Assistant Examiner* — Darrell C Ford
(74) *Attorney, Agent, or Firm* — Michael J. Feigin, Esq.; Feigin and Fridman LLC

(57) ABSTRACT

A composite open web beam joist includes a cambered beam joist portion including a top end, a bottom end, a first side, a second side, and an open web layout extending from end to end. The open web layout includes triangular web sections and openings between each of the triangular web sections. Each triangular web section includes a peak. A first chord angle beam is attached to the first side of the cambered beam-joist portion at the peaks of the triangular web sections. A second chord angle beam is attached to the second side of the cambered beam-joist at the peaks of the triangular web sections. A plate is vertically attached to a center of the top end of the cambered beam-joist. The plate extended longitudinally along the center of the top end of the cambered beam joist portion. The plate includes a distal end having a flange and a recess.

10 Claims, 23 Drawing Sheets

(56) References Cited

U.S. PATENT DOCUMENTS

| | | | |
|---|---|---|---|
| 6,807,789 B1* | 10/2004 | Kim | E04C 3/294 |
| | | | 52/847 |
| 8,240,108 B2 | 8/2012 | Pyo | |
| 8,407,966 B2 | 4/2013 | Strickland et al. | |
| 8,516,762 B1* | 8/2013 | Jendusa | E04B 5/263 |
| | | | 52/407.4 |
| 9,523,201 B2 | 12/2016 | Romanenko | |
| 10,125,493 B2 | 11/2018 | Palermo et al. | |
| 10,501,932 B1 | 12/2019 | Rulon | |
| 2003/0167724 A1* | 9/2003 | McCracken | E04C 3/07 |
| | | | 52/696 |
| 2010/0139201 A1* | 6/2010 | Strickland | E04C 3/292 |
| | | | 52/634 |
| 2012/0124796 A1* | 5/2012 | Ibanez | E04C 3/07 |
| | | | 29/33 K |
| 2021/0222434 A1* | 7/2021 | McManus | E04C 5/065 |

\* cited by examiner

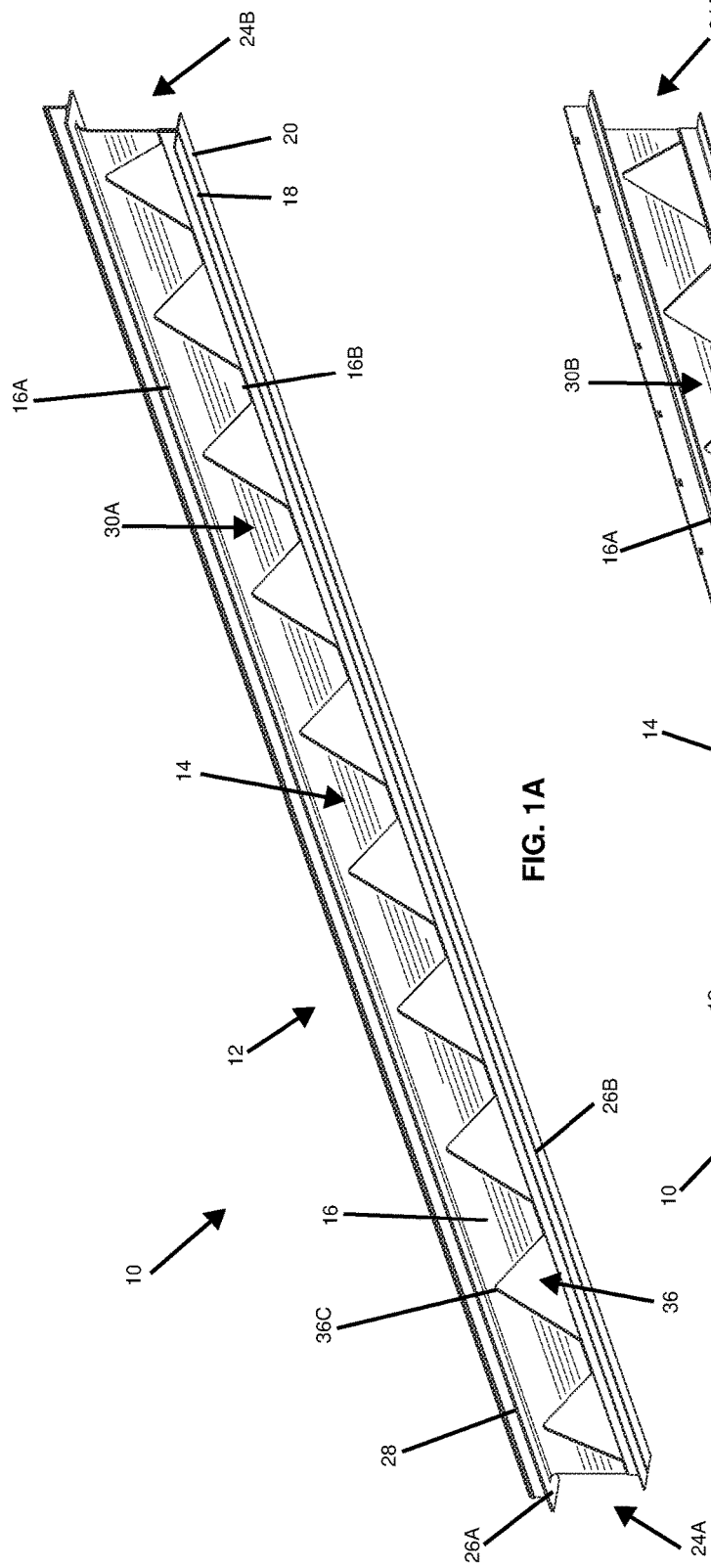
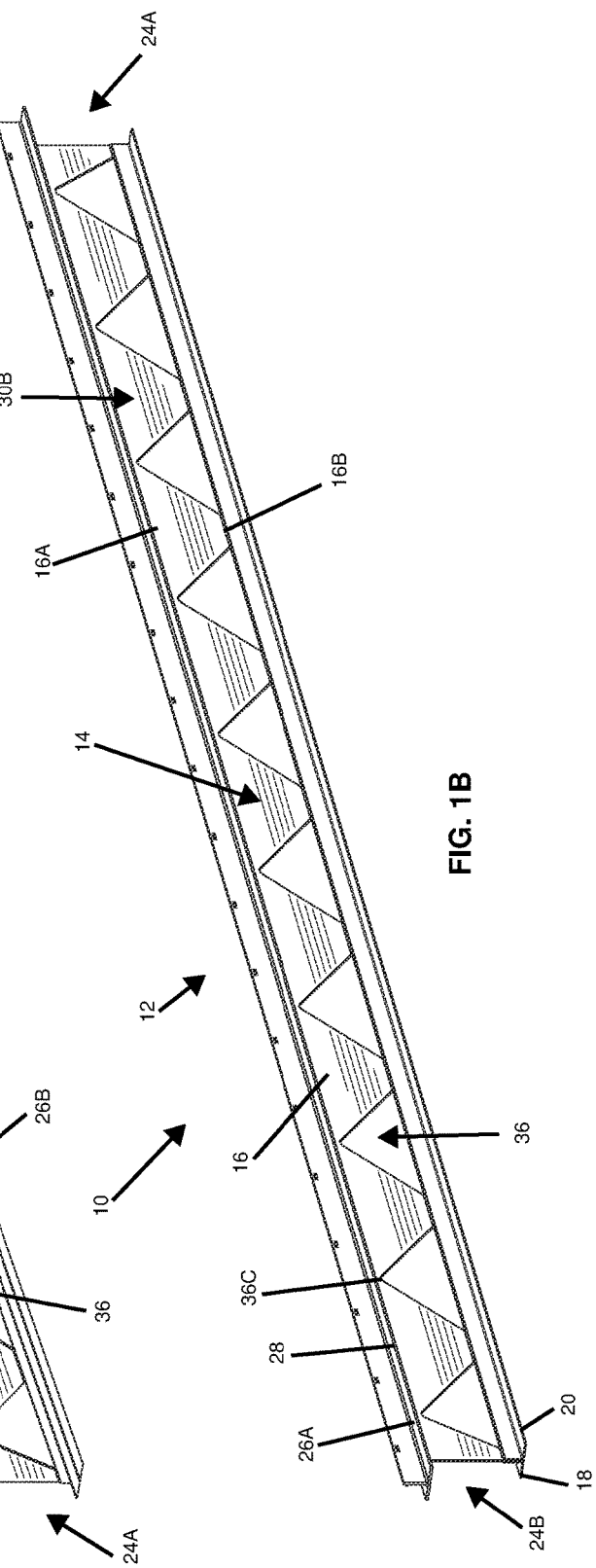
FIG. 1A
FIG. 1B

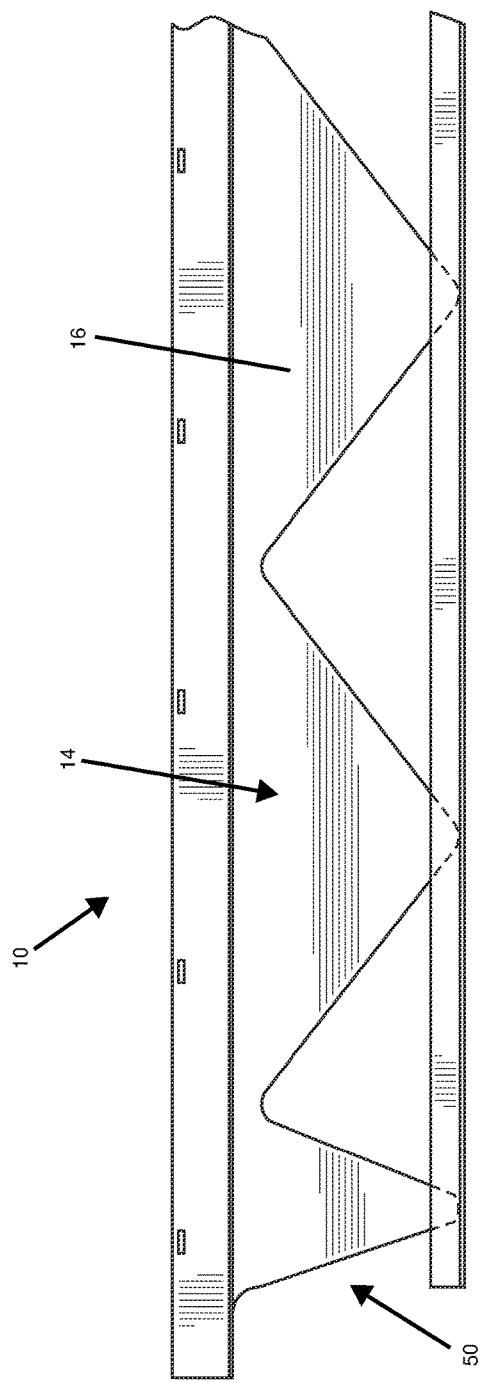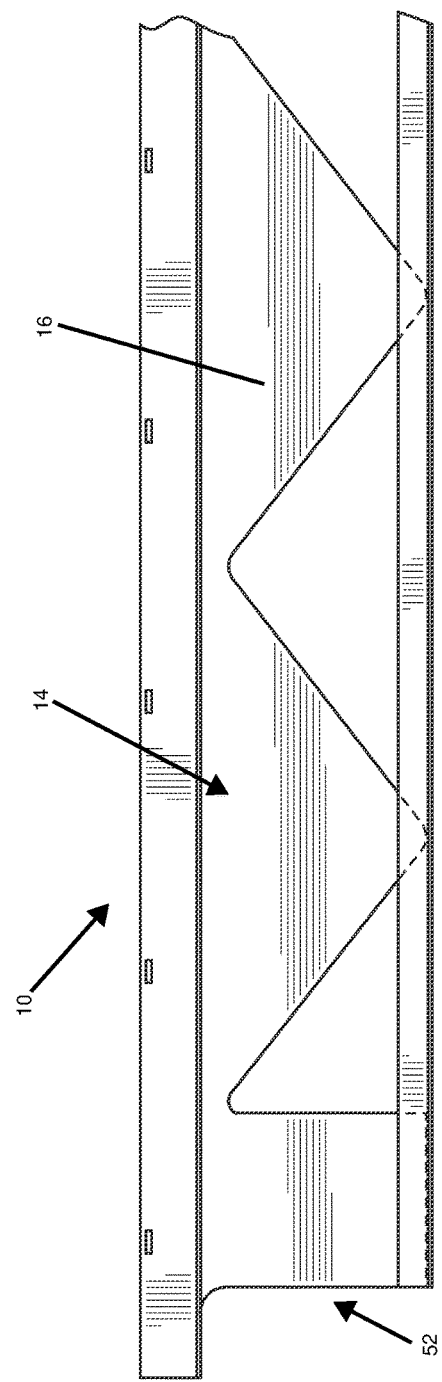
FIG. 6C
FIG. 6D

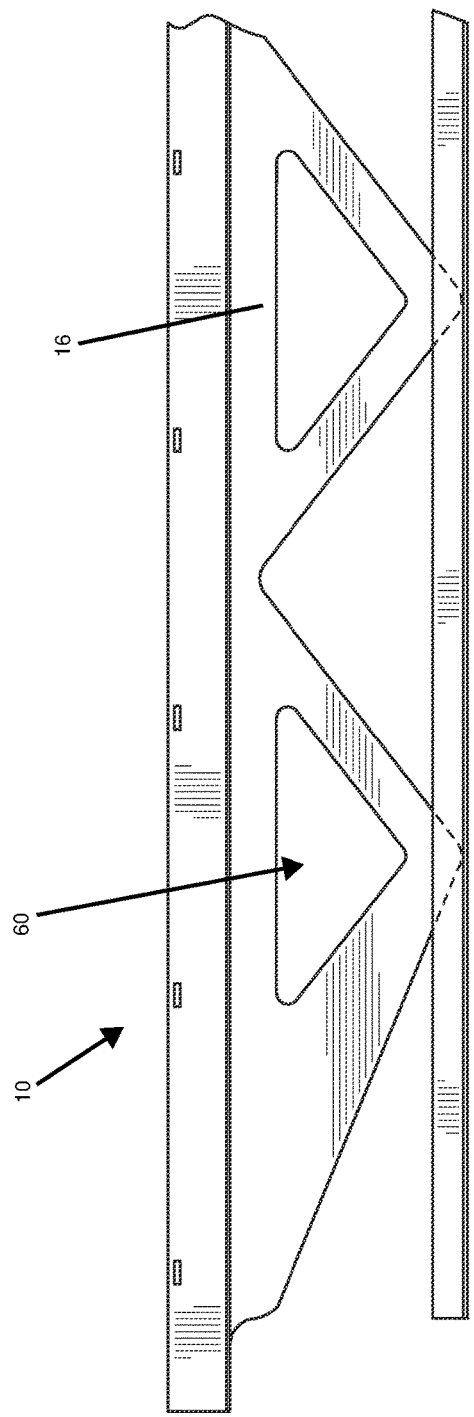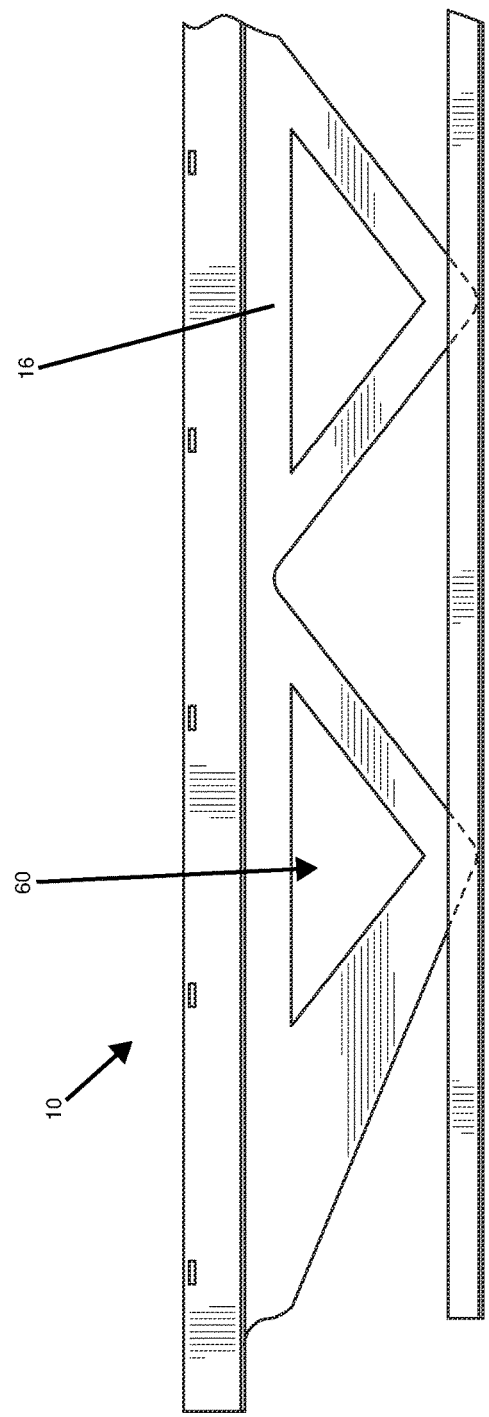

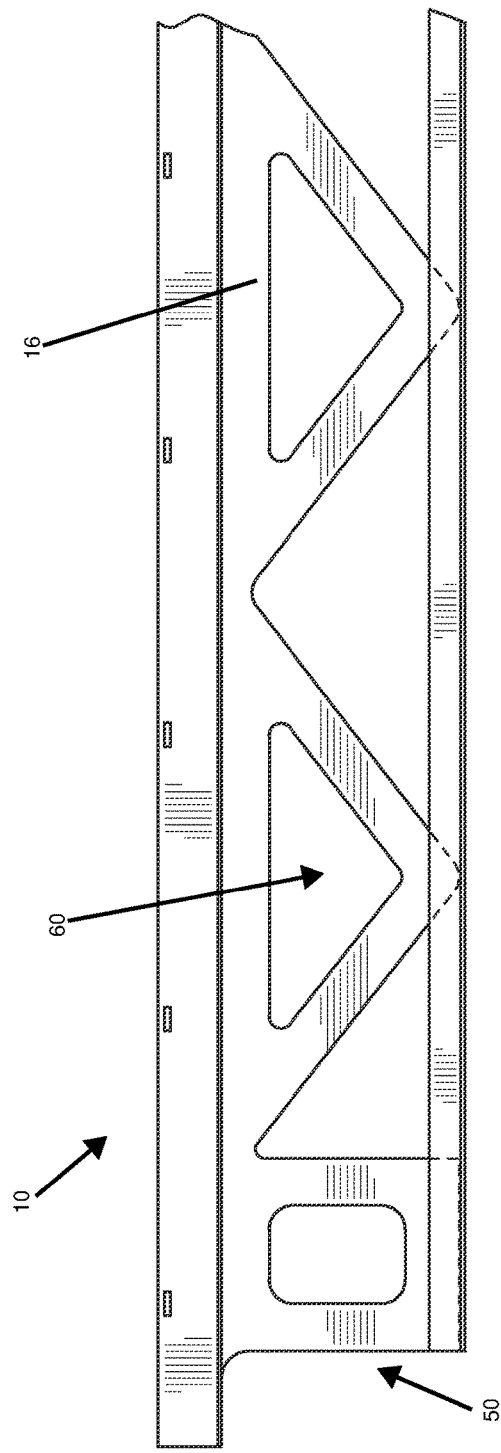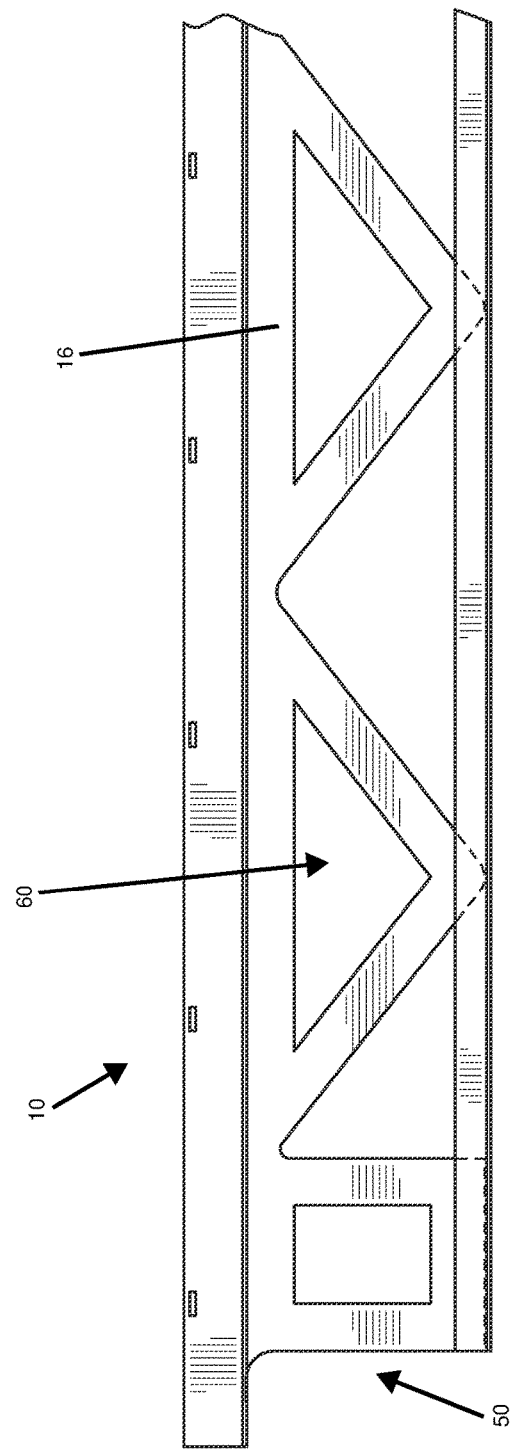

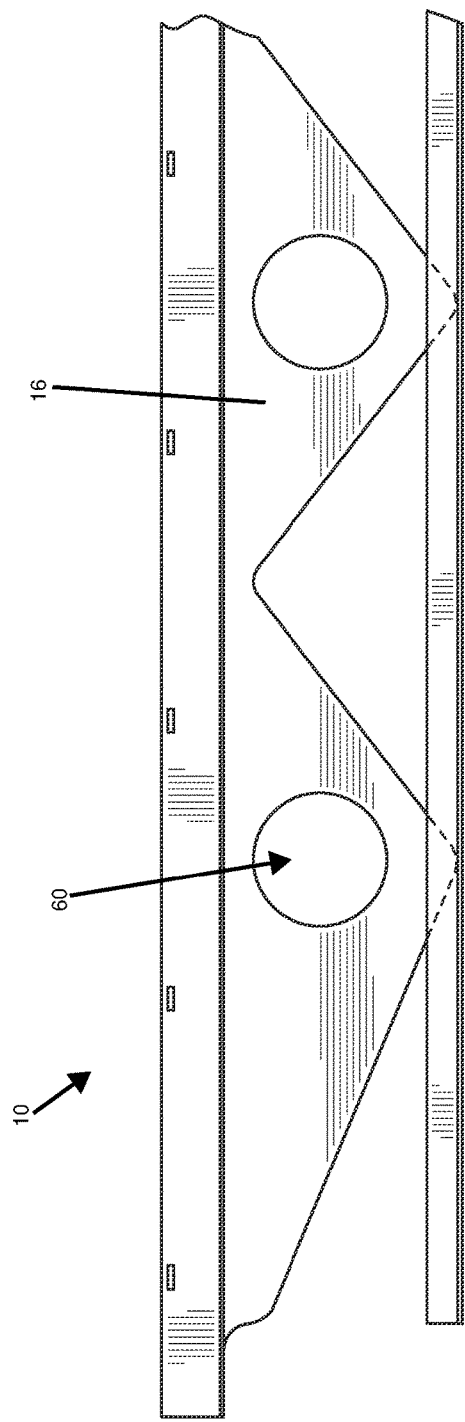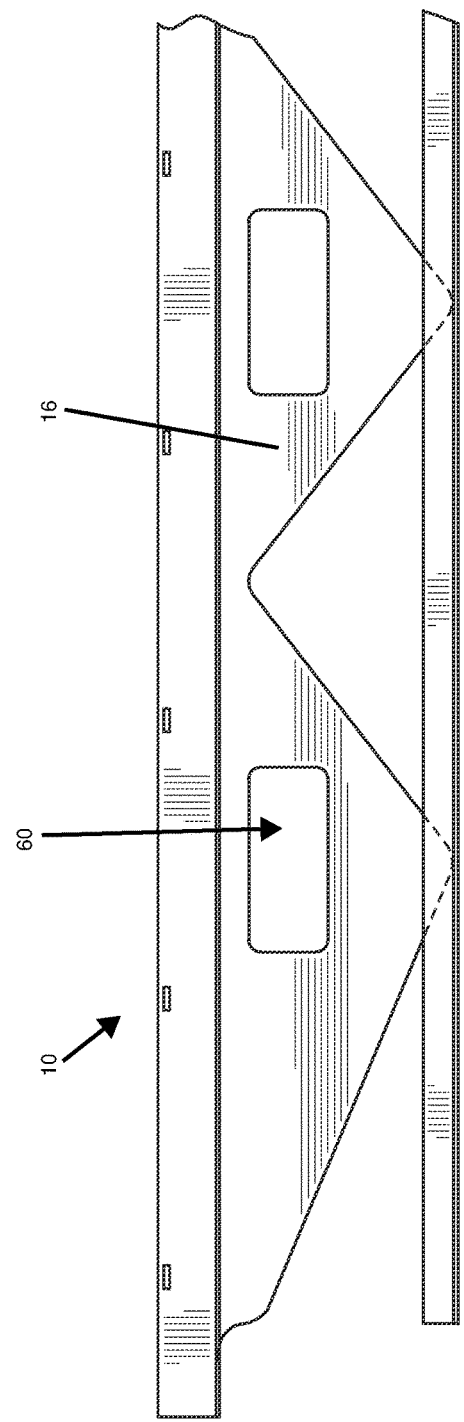

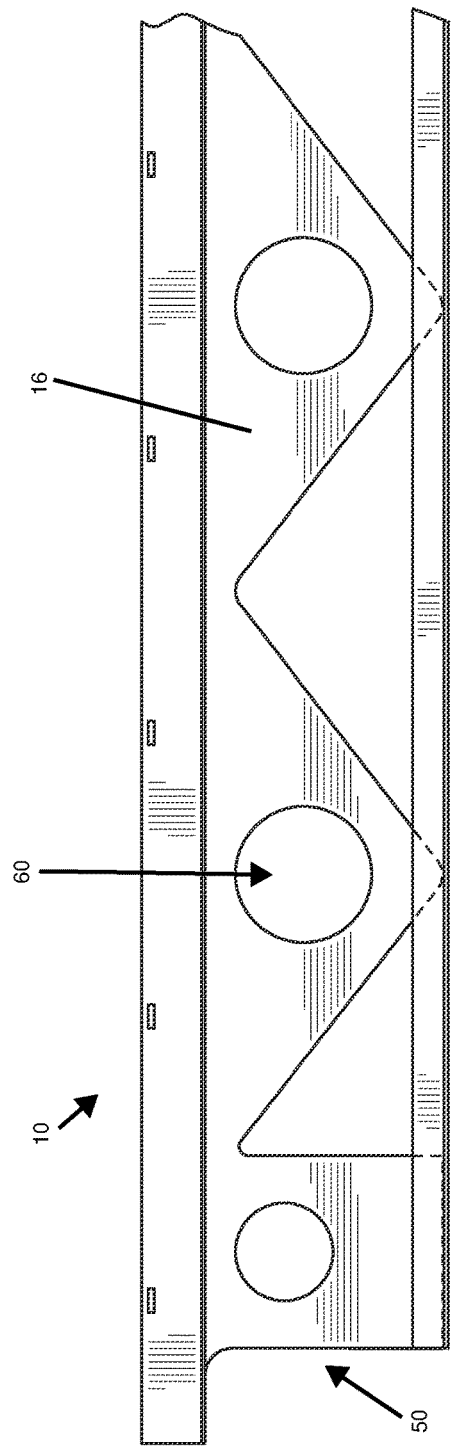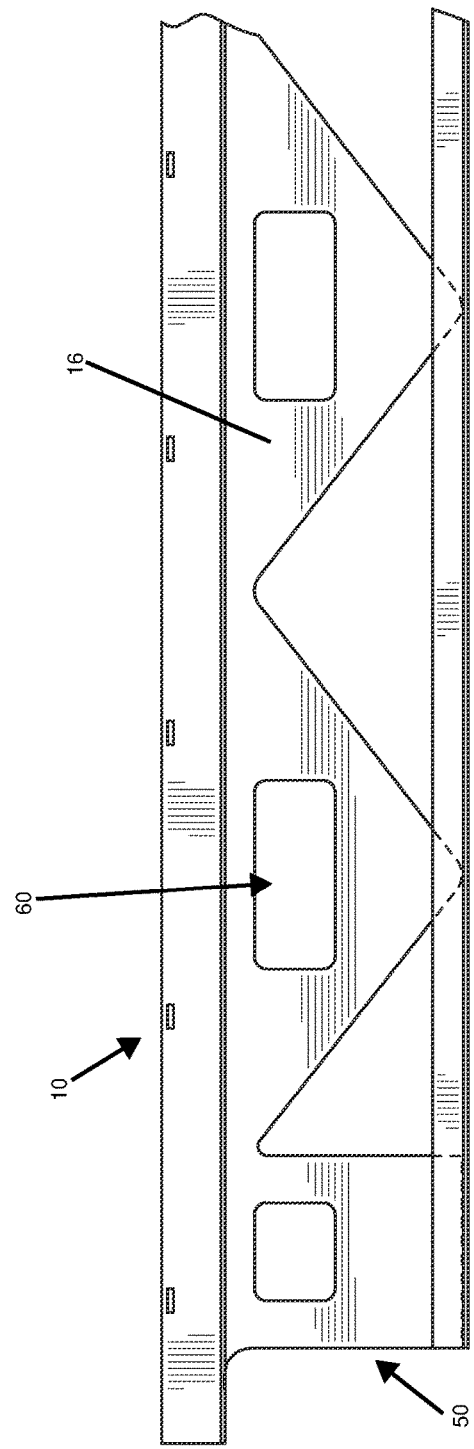
FIG. 12C
FIG. 12D

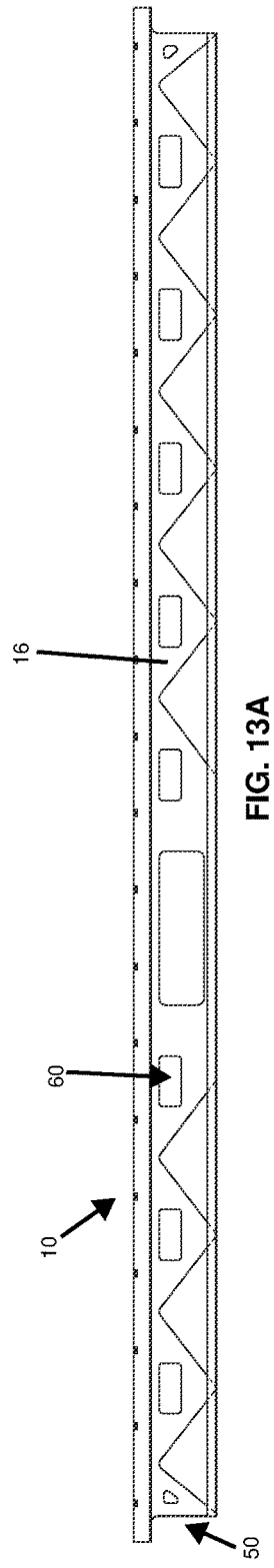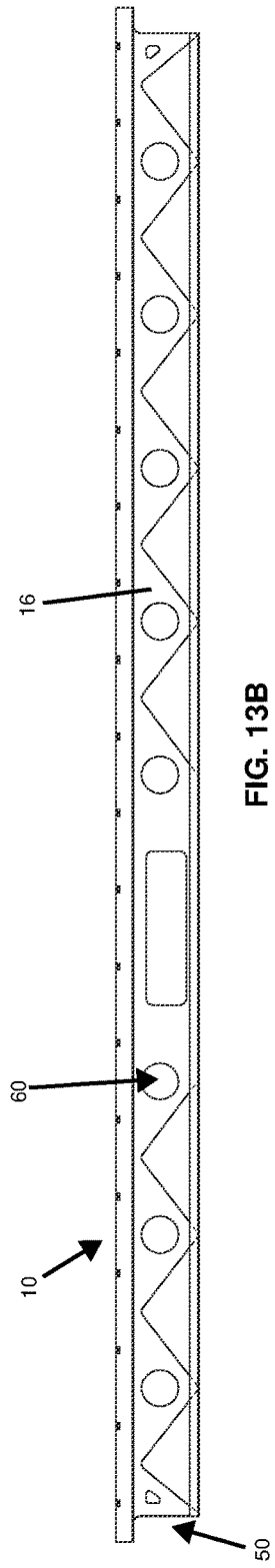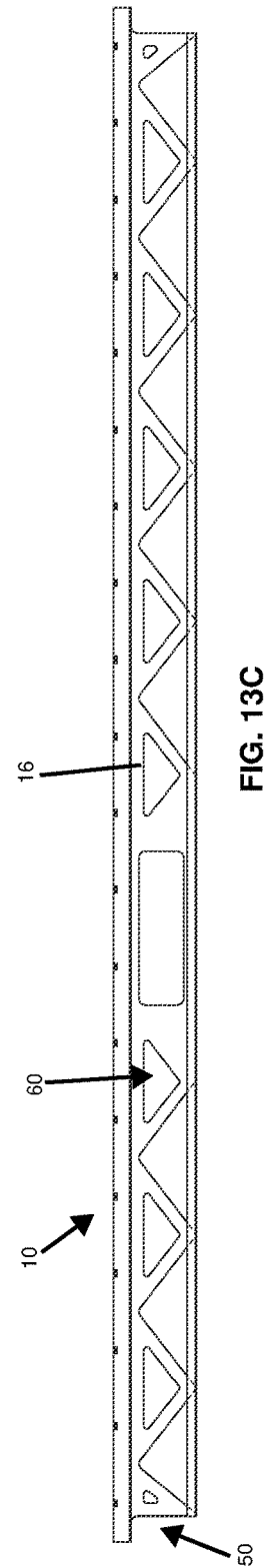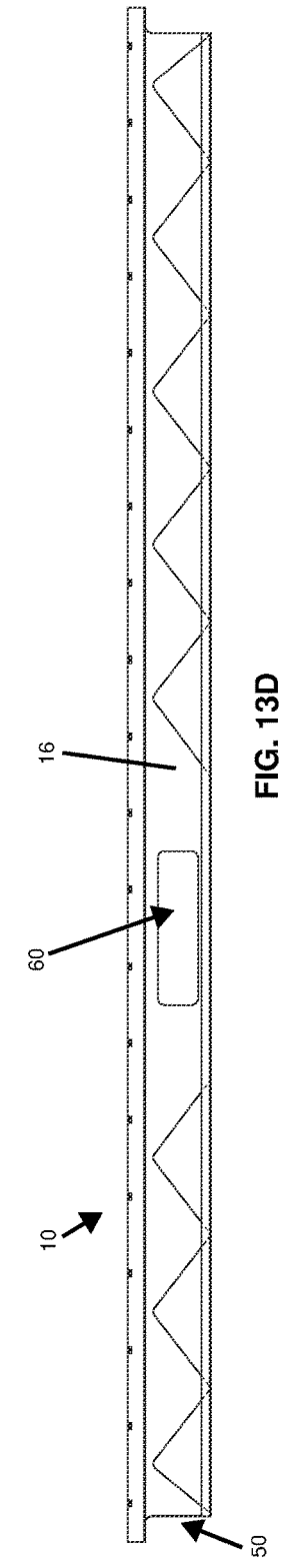

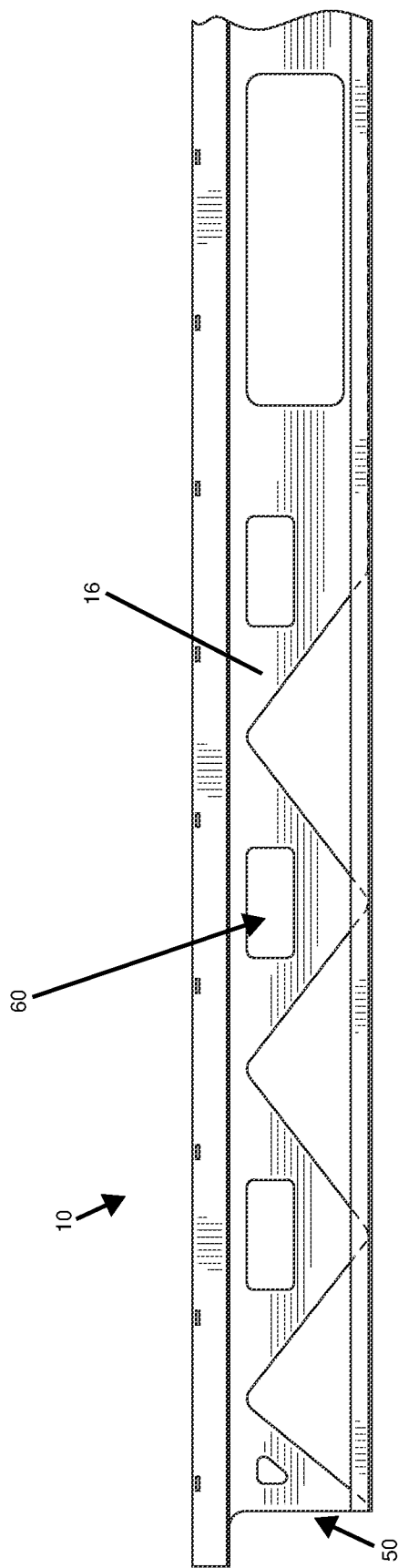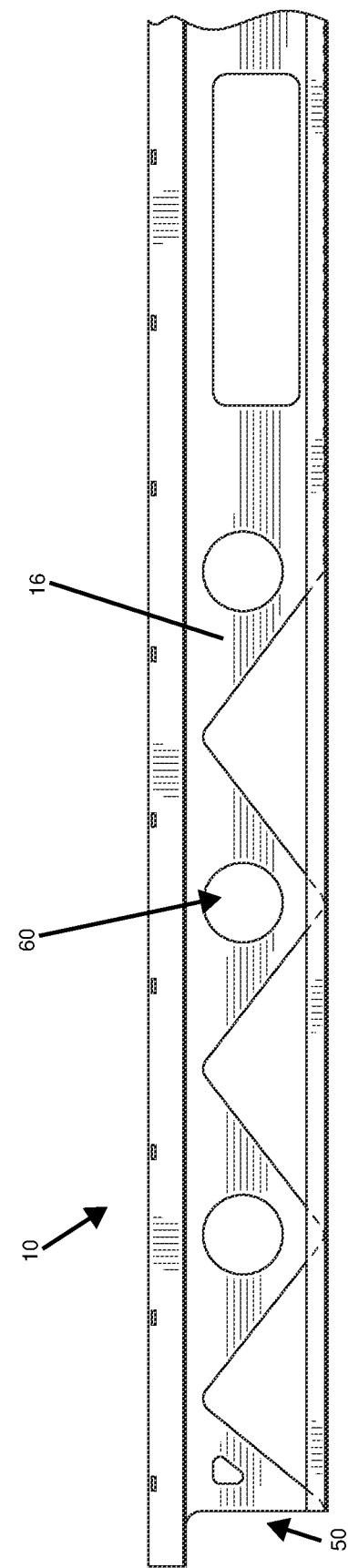
FIG. 14A
FIG. 14B

COMPOSITE OPEN WEB BEAM-JOIST AND METHOD OF MANUFACTURE

FIELD OF THE DISCLOSED TECHNOLOGY

The disclosed technology relates generally to joists. More specifically, the disclosed technology relates to a composite open web beam joist and a method of making the same.

BACKGROUND OF THE DISCLOSED TECHNOLOGY

Currently most commercial buildings and some apartment complexes are constructed making use of steel supported concrete floors and roofs. Traditional methods employ steel joists, usually being placed parallel to one another, being secured at each of their ends to structural building members such as steel or concrete beams or girders. Each joist end rests on these members, the beams generally running perpendicular to the placement of the joists. The steel joist themselves are usually of the open-web design, each one consisting of a zigzag shaped rod connecting a joist top chord and a bottom chord which run a spaced distance apart and parallel to one another. Both the top and bottom chords are comprised of opposed angle iron members affixed together by means of the apices of the connecting rod. The bearing end of each joist is further comprised of a pair of flange-connected seat angles extending laterally from each opposed angle iron to form a pair of U-shaped channels at each joist bearing end. Corrugated metal decking is then placed on top of the joists, and finally concrete is poured over the corrugated decking and the joist ends and top surface of the beams or girders.

It would therefore be desirable to provide a superior beam-joist structure for use in construction of large buildings and simplified and economical methods of manufacture for this beam-joist structure.

SUMMARY OF DISCLOSED TECHNOLOGY

The disclosed technology provides a composite open web beam joist including a beam-joist including a first end, a second end opposite the first end, a top end having a flange, a bottom end opposite the top end, a first side, a second side opposite the first side, and an open web layout extending between the first end and second end, the open web layout including a plurality of triangular web sections extending between the top end and the bottom end and an opening between the triangular web sections, each triangular web section including a base disposed at the top end and a peak disposed at the bottom end, a first chord angle beam attached to the first side of the cambered beam-joist at the peaks of the triangular web sections, and a second chord angle beam attached to the second side of the cambered beam-joist at the peaks of the triangular web sections.

In embodiments, the composite open web beam joist further includes a vertical plate attached to a center of the top end of the cambered beam-joist, the plate extending longitudinally along the top end of the cambered beam-joist between the first end and the second end of the cambered beam-joist portion, the plate including a first side, a second side opposite the first side, a distal end, and a proximal end opposite the distal end, the first side including a flange at the distal end, the second side including a recess at the distal end.

In some embodiments, the plate is attached to the center of the top end of the cambered beam joist with substantially 12-inch-long continuous welds on the first side of the plate and the second side of the plate at a juncture where the proximal end of the plate meets the top end of the cambered beam joist portion, the 12-inch-long continuous welds disposed at the first end and the second end of the cambered beam-joist portion.

In other embodiments, the plate further includes substantially 2-inch-long continuous welds on the first side of the plate and the second side of the plate at the juncture where the proximal end of the plate meets the top end of the cambered beam joist portion to further weld the plate to the center of the top end of the cambered beam-joist portion, the 2-inch-long continuous welds staggered 12 inches apart on the first side and the second side of the plate.

In some embodiments, the 12-inch-long continuous welds and the 2-inch-long continuous welds comprise a thickness of 3/16 inches.

In embodiments, the first chord angle beam is equidistant from a center of all the triangular web sections, the second chord angle beam mirrors the first chord angle beam and is equidistant from a center of all the triangular web sections, and the first chord angle beam and the second chord angle beam are attached to each other in parallel.

In some embodiments, the first chord angle beam is welded to the first side of the cambered beam-joist portion at the peaks of the triangular web sections, the second chord angle beam is welded to the second side of the cambered beam-joist portion at the peaks of the triangular web sections.

In certain embodiments, the beam-joist is cambered along a vertical plane of the beam-joist.

In other embodiments, the openings of the open web layout each include a center that is substantially 24 inches from a center of an adjacent opening.

The disclosed technology also provides a method of manufacturing a composite open web beam joist from a beam having a closed uniform web layout including cutting the beam longitudinally along the closed uniform web layout to form a beam joist portion including a first end, a second end opposite the first end, a top end, a bottom end opposite the top end, a first side, a second side opposite the first side, and an open web layout extending between the first end and the second end, the open web layout including a plurality of triangular web sections extending between the top end and the bottom end and an opening between the triangular web sections, each of the triangular web sections including a base disposed at the top end and a peak disposed at the bottom end, cambering the beam-joist portion to bend the beam-joist portion along a vertical plane thereof to form a cambered beam-joist portion, attaching a first chord angle beam to the first side of the cambered beam joist portion at the peaks of the triangular web sections, attaching a second chord angle beam to the second side of the cambered beam-joist portion at the peaks of the triangular web sections, and attaching a plate vertically to the top end of the cambered beam-joist portion such that the plate extends longitudinally along the top end of the cambered beam-joist portion between the first end and the second end of the cambered beam-joist portion, the plate including a first side, a second side opposite the first side, a distal end, and a proximal end opposite the distal end, the first side including a flange at the distal end, the second side including a recess at the distal end.

In some embodiments, the method further includes attaching the first chord angle beam and the second chord angle beam to each other.

In other embodiments, the method further includes securing the beam on a table prior to cutting the beam to ensure stability of the beam while cutting.

In certain embodiments, the beam is cut such that the openings of the open web layout each include a center that is substantially 24 inches from a center of an adjacent opening.

In embodiments, the first chord angle beam is attached to the first side of the cambered beam-joist portion at the peaks of the triangular web sections such that the first chord angle beam is equidistant from a center of all the triangular web sections and the second chord angle beam is attached to the second side of the cambered beam joist portion at the peaks of the triangular web sections such that the second chord angle beam mirrors the first chord angle beam and is equidistant from a center of all the triangular web sections.

In some embodiments, the first chord angle beam is attached to the first side of the cambered beam-joist portion at the peaks of the triangular web sections via welding and the second chord angle beam is attached to the second side of the cambered beam-joist portion at the peaks of the triangular web sections via a welding.

In embodiments, the plate is vertically attached to a center of the top end of the cambered beam-joist portion via welding.

In some embodiments, the plate is welded by welding substantially 12-inch-long continuous welds on the first side of the plate and the second side of the plate at a juncture where the proximal end of the plate meets the top end of the cambered beam-joist portion.

In certain embodiments, the substantially 12-inch-long continuous welds are made at the first end and the second end of the cambered beam-joist portion.

In some embodiments, the plate is further welded to the center of the top end of the cambered beam-joist portion by welding substantially 2-inch-long continuous welds on the first side of the plate and the second side of the plate at the juncture where the proximal end of the plate meets the top end of the cambered beam-joist portion, and the 2-inch-long continuous welds are staggered 12 inches apart on the first side and the second side of the plate, wherein each of the 12-inch-long continuous welds and the 2-inch-long continuous welds comprise a thickness of 3/16 inches.

"Triangular web sections" or "triangular", in this application is defined as having two oppositely disposed sides which meet at any of a pointed vertex, flat side being acute to each oppositely disposed side, or which meet at an ovoid end."

"Composite" refers to "being made up of various parts, components, or elements. and creates a bond and becomes one." "Web" refers to "the vertical portion of a beam that takes on shear force." "Camber" or "Cambering" refers to "bending or curving sections of metal." "Chords" or "chord angle beams" refers to "the structural reinforcement legs or a framework of a composite beam-joist."

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

BRIEF DESCRIPTION OF THE DRAWINGS

FIG. 1A shows a front perspective view of the composite open web beam-joist according to one embodiment of the present disclosed technology.

FIG. 1B shows a rear perspective view of the composite open web beam-joist according to one embodiment of the present disclosed technology.

FIG. 6C shows a close-up view of the composite open web beam-joist of FIG. 5C according to one embodiment of the present disclosed technology.

FIG. 6D shows a close-up view of the composite open web beam-joist of FIG. 5D according to one embodiment of the present disclosed technology.

FIG. 10A shows a close-up view of the composite open web beam joist of FIG. 9A according to one embodiment of the present disclosed technology.

FIG. 10B shows a close-up view of the composite open web beam joist of FIG. 9B according to one embodiment of the present disclosed technology.

FIG. 10C shows a close-up view of the composite open web beam-joist of FIG. 9C according to one embodiment of the present disclosed technology.

FIG. 10D shows a close-up view of the composite open web beam-joist of FIG. 9D according to one embodiment of the present disclosed technology.

FIG. 12A shows a close-up view of the composite open web beam joist of FIG. 11A according to one embodiment of the present disclosed technology.

FIG. 12B shows a close-up view of the composite open web beam-joist of FIG. 11B according to one embodiment of the present disclosed technology.

FIG. 12C shows a close-up view of the composite open web beam-joist of FIG. 11C according to one embodiment of the present disclosed technology.

FIG. 12D shows a close-up view of the composite open web beam-joist of FIG. 11D according to one embodiment of the present disclosed technology.

FIG. 13A shows an elevation view of the composite open web beam-joist, illustrating the cut-outs within an open web layout according to one embodiment of the present disclosed technology.

FIG. 13B shows an elevation view of the composite open web beam-joist, illustrating the cut-outs within an open web layout according to another embodiment of the present disclosed technology.

FIG. 13C shows an elevation view of the composite open web beam-joist, illustrating the cut-outs within an open web layout according to yet another embodiment of the present disclosed technology.

FIG. 13D shows an elevation view of the composite open web beam-joist, illustrating the cut-outs within an open web layout according to an alternative embodiment of the present disclosed technology.

FIG. 14A shows a close-up view of the composite open web beam joist of FIG. 13A according to one embodiment of the present disclosed technology.

FIG. 14B shows a close-up view of the composite open web beam-joist of FIG. 13B according to one embodiment of the present disclosed technology.

DETAILED DESCRIPTION OF EMBODIMENTS OF THE DISCLOSED TECHNOLOGY

Figure 2A:
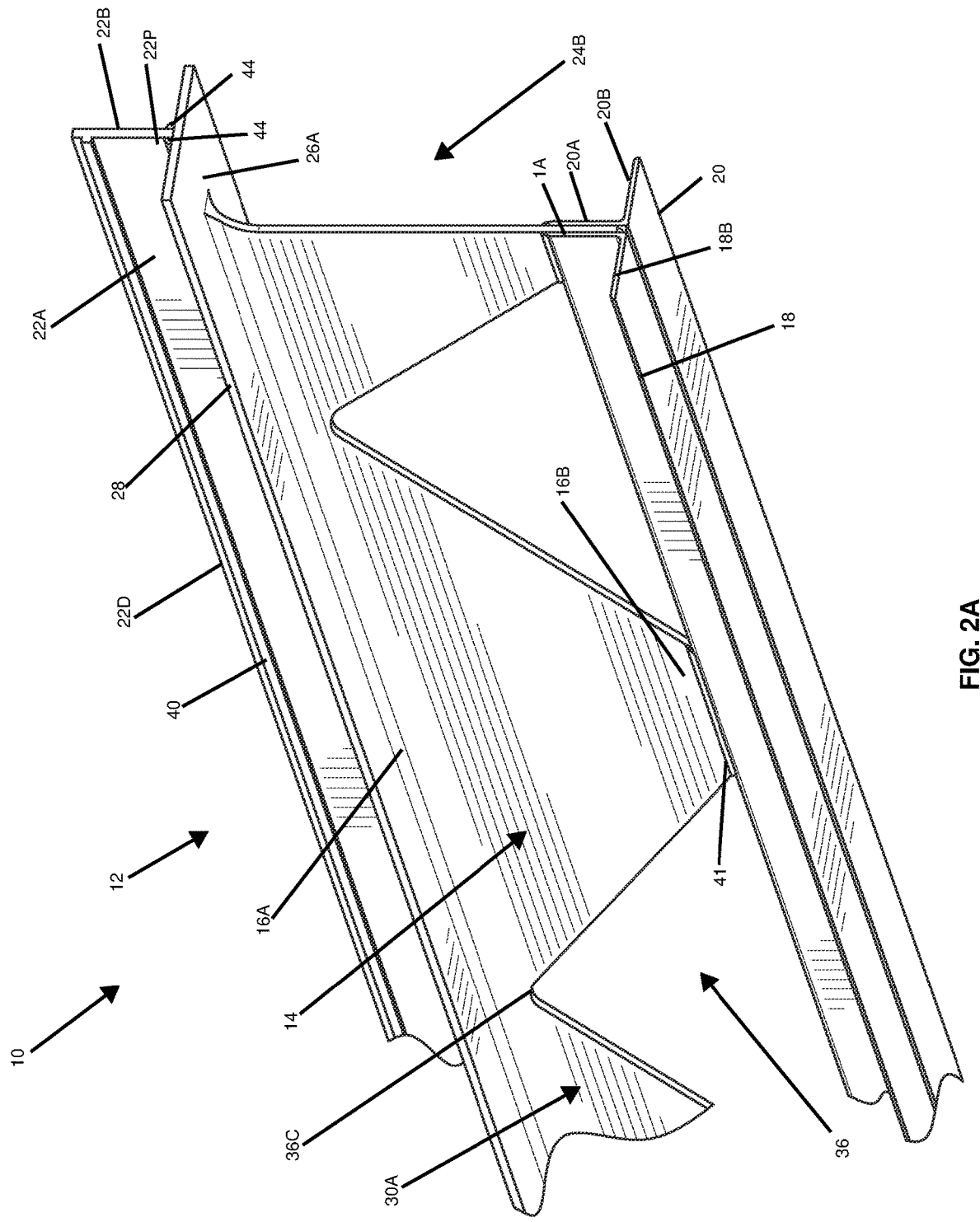
FIG. 2A shows front perspective view of a portion of the composite open web beam joist according to one embodiment of the present disclosed technology.
Figure 2B:
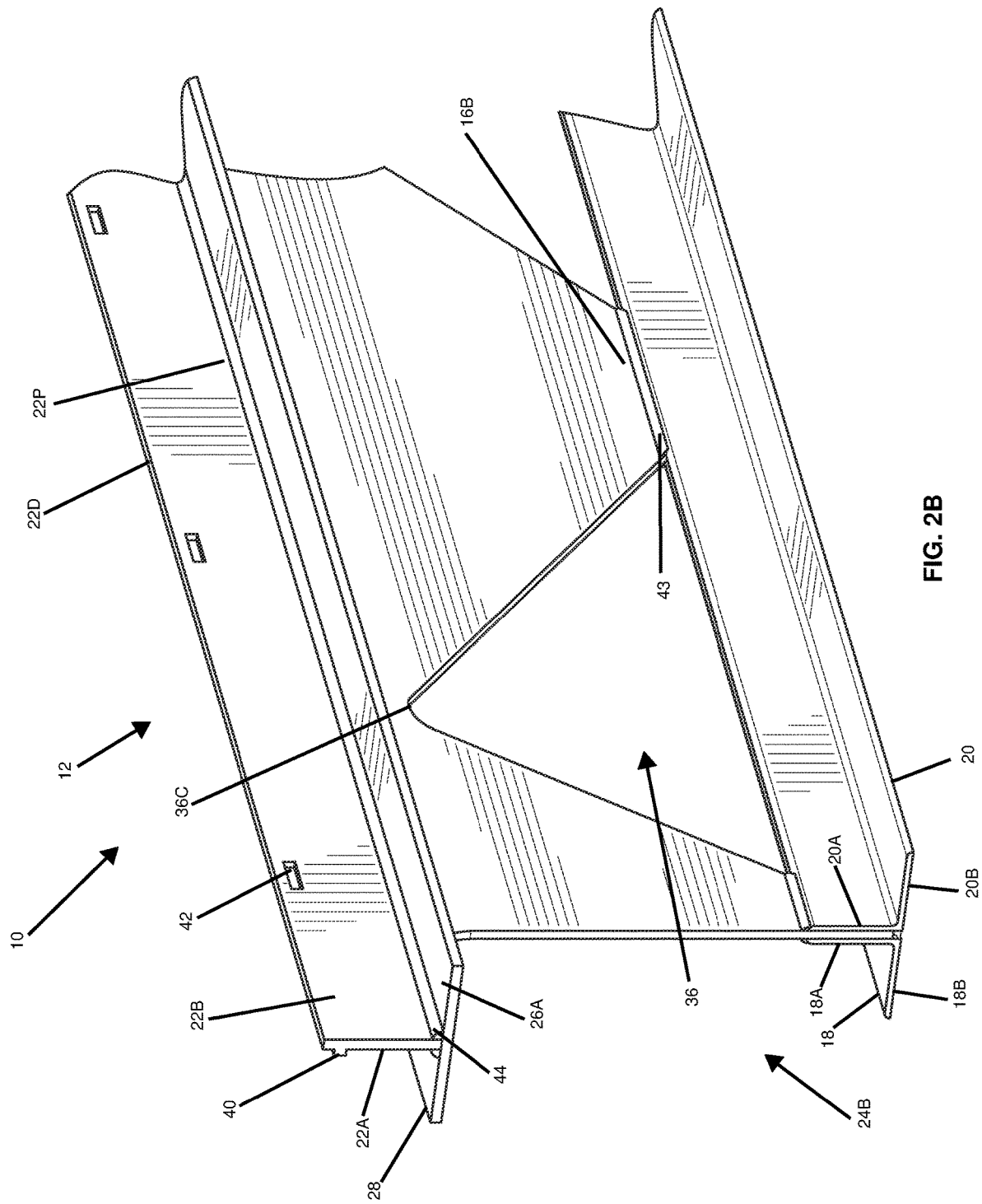
FIG. 2B shows a rear perspective view of a portion of the composite open web beam-joist according to one embodiment of the present disclosed technology.

The present disclosed technology provides a composite open web beam-joist as well as a method of manufacturing the open web beam-joist from a beam having a closed uniform web layout. The composite open web beam-joist 10 comprises a cambered beam-joist portion 12 including an open web layout 14 including a plurality of triangular web sections 16, a first chord angle beam 18 attached the triangular web sections 16, a second chord angle beam 20 attached to the triangular web sections 16, and a vertical plate 22 (which herein refers to 22A, 22B, 22C, and 22D as further described below) attached to a top of the cambered beam-joist 12 opposite the first and second chord angles 18, 20. In embodiments, the composite open web beam joist 10 includes a bearing seat having a width of at least 2 ½ inches. In some embodiments, the composite open web beam joist 10 comprises a layer of primer.

Figure 3:
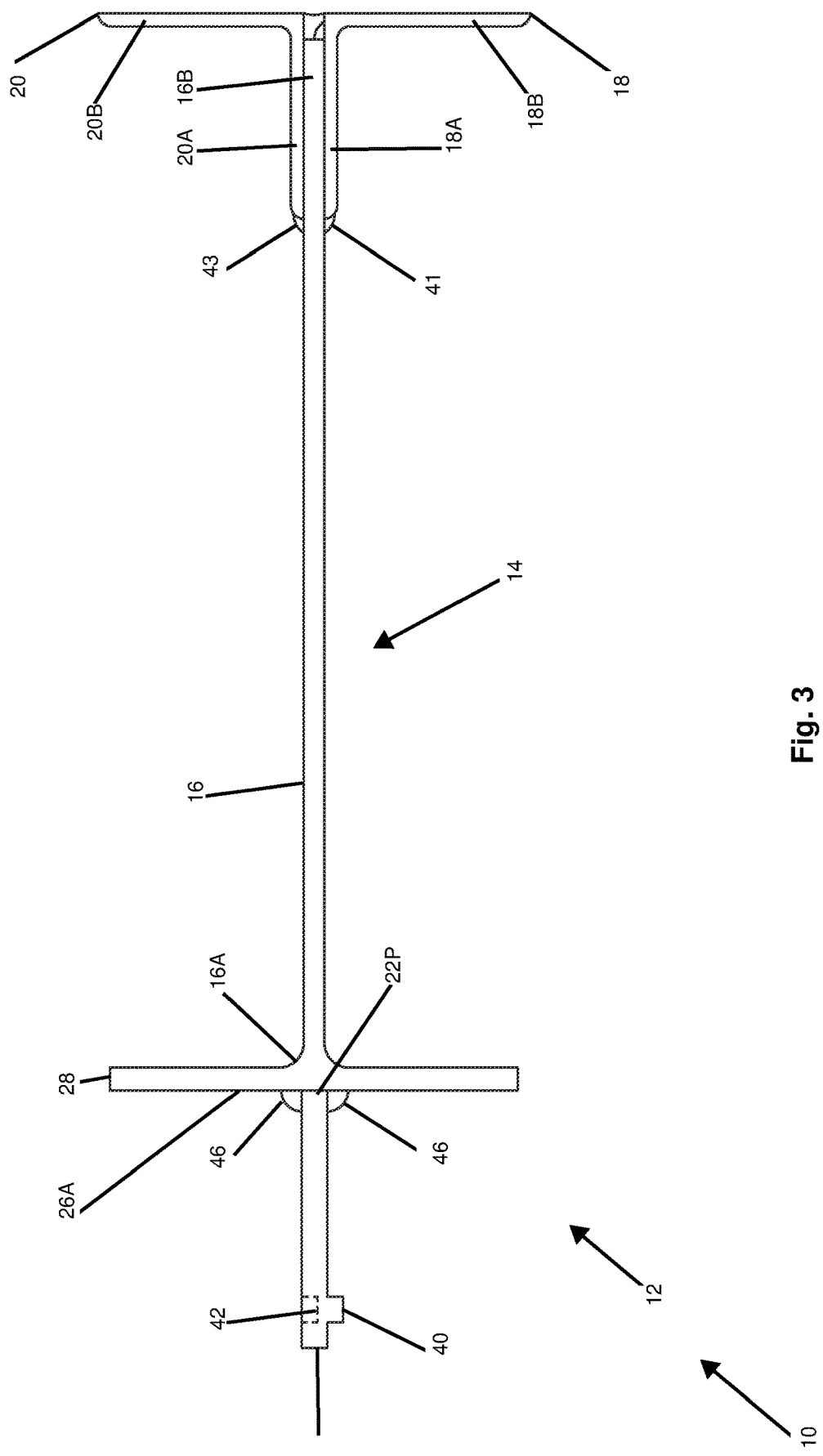
FIG. 3 shows a cross-sectional view of the composite open web beam-joist according to one embodiment of the present disclosed technology.

Referring to FIGS. 1A-3, simultaneously, FIG. 1A shows a front perspective view of the composite open web beam-joist according to one embodiment of the present disclosed technology. FIG. 1B shows a rear perspective view of the composite open web beam-joist according to one embodiment of the present disclosed technology. FIG. 2A shows front perspective view of a portion of the composite open web beam joist according to one embodiment of the present disclosed technology. FIG. 2B shows a rear perspective view of a portion of the composite open web beam joist according to one embodiment of the present disclosed technology. FIG. 3 shows a cross-sectional view of the composite open web beam-joist according to one embodiment of the present disclosed technology. In embodiments of the disclosed technology the web beam joist is formed from two different beam joists which are welded together. In one beam joist, the triangular web is cut therefrom or thereinto and the other beam joist is a linear beam welded thereto.

The cambered beam-joist portion 12 further includes a first end 24A, a second end 24B opposite the first end 24A, a top end 26A having a flange 28, a bottom end 26B opposite the top end 26A, a first side 30A, a second side 30B opposite the first side 30A. The open web layout 14 extends between the first end 24A and second end 24B. Each of the plurality of triangular web sections 16 extends between the top end 26A and the bottom end 26B. The open web layout 14 further includes an opening 36 between each of the triangular web sections 16. Each triangular web section 16 includes a base 16A disposed at the top end 26A and a peak 16B at the bottom end 26B. The cambered beam joist 12 is made from metal such as steel, iron, aluminum, and the like. The cambered beam-joist portion 12 is cambered along a vertical plane of the beam-joist 12. In embodiments, the triangular web sections 16 are uniform with respect to each other in terms of area or cross-sectional area. In other embodiments, the triangular web sections 16 are irregular with respect to one another and do not include a consistent area or cross-sectional area. In some embodiments, the openings 36 each include a center 36C that is substantially 24 inches from the center 36C of an adjacent opening 36.

The first chord angle beam 18 includes an L-shaped metal beam having a first portion 18A and a second portion 18B. The second chord angle beam 20 also includes an L-shaped metal beam having a first portion 20A and a second portion 20B. The first portion 18A of the first chord angle beam 18 is attached to the first side 30A of the cambered beam-joist portion 12 at the peaks 16B of each of the triangular web sections 16. The first portion 20A of second chord angle beam 20 is attached to the second side 30B of the cambered beam-joist portion 12 at the peaks 16B of each of the triangular web sections 16.

In embodiments, each attachment point of the first chord angle beam 18 and the second chord angle beam 20 to the triangular web sections 16 is equidistant to a center of the respective triangular web section 16 to which it is attached. In some embodiments, the first chord angle beam 18 and the second chord angle beam 20 are attached to each other in parallel, or mirror each other, such that the second portion 18B of the first chord angle beam 18 and the second portion 20B of the second chord angle beam 18 align with each other on the same plane to form a flush bearing seatf. In other embodiments, the first chord angle beam 18 and the second chord angle beam 20 each include an equal length of which is equal to the length of the cambered beam-joist portion 12.

In embodiments, the first portion 18A of the first chord angle beam 18 is attached to the first side 30A of the cambered beam-joist portion 12 with welds 41 fashioned with welding. The first portion 20A of second chord angle beam 20 is attached to the second side 30B of the cambered beam-joist portion 12 welds 43 fashioned with welding. The first chord angle beam 18 and the second chord angle beam 20 are attached to each other via welding.

The vertical plate 22 is attached vertically to a center of the top end 26A of the cambered beam-joist portion 12 such that it protrudes off the top end 26A of the cambered beam-joist portion 12. The plate 22 extends longitudinally along the top end 26A of the cambered beam-joist portion 12 between the first end 24A and the second end 24B of the cambered beam-joist portion 12. The plate 22 is planar and includes a first side 22A, a second side 22B opposite the first side 22A, a distal end 22D, and a proximal end 22P opposite the distal end 22D. {The first side 22A includes a flange 40 at the distal end 22D that extends along the length of the plate 22 from end to end. The second side 22B includes one or more recesses 42 at the distal end 22D that are spaced at regular intervals along the length of the plate 22.}

The plate 22 is attached to the center of the top end 26A of the cambered beam joist portion 12 with substantially 12-inch-long continuous welds 44 on the first side 22A of the plate 22 and the second side 22B of the plate 22B at the juncture where the proximal end 22P of the plate 22 meets the top end 26A of the cambered beam-joist portion 12. The 12-inch-long continuous welds 44 are disposed at the first end 24A and the second end 24B of the cambered beam-joist portion 12.

In embodiments, the plate 22 further includes substantially 2-inch-long continuous welds 46 on the first side 22A of the plate 22 and the second side 22B of the plate 22 at the juncture where the proximal end 22P of the plate 22 meets the top end 26A of the cambered beam-joist portion 12 to further weld the plate 22 to the center of the top end 26A of the cambered beam-joist portion 12. The 2-inch-long continuous welds 46 are staggered 12 inches apart on the first side 22A and the second side 22B of the plate 22. In some embodiments, the 12-inch-long continuous welds 44 and the 2-inch-long continuous welds 46 comprise a thickness of $^{3}/_{16}$ inches.

Figure 5A:
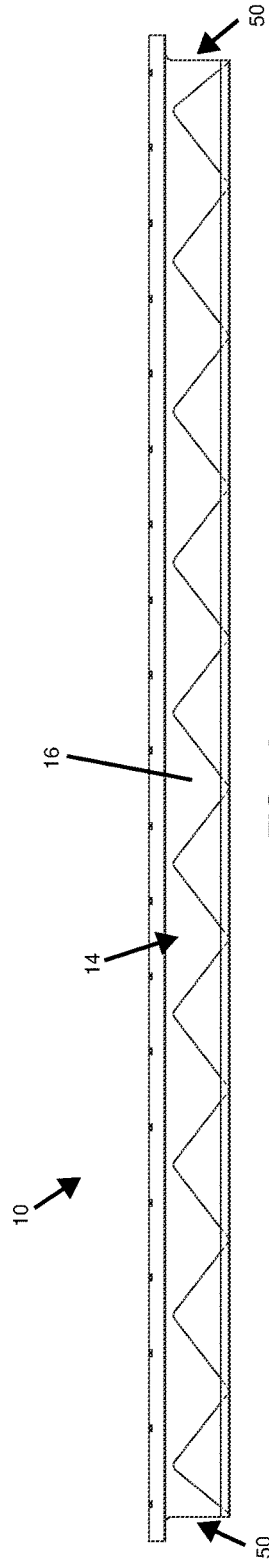
FIG. 5A shows an elevation view of the composite open web beam-joist, illustrating the open web layout according to one embodiment of the present disclosed technology.
Figure 5B:
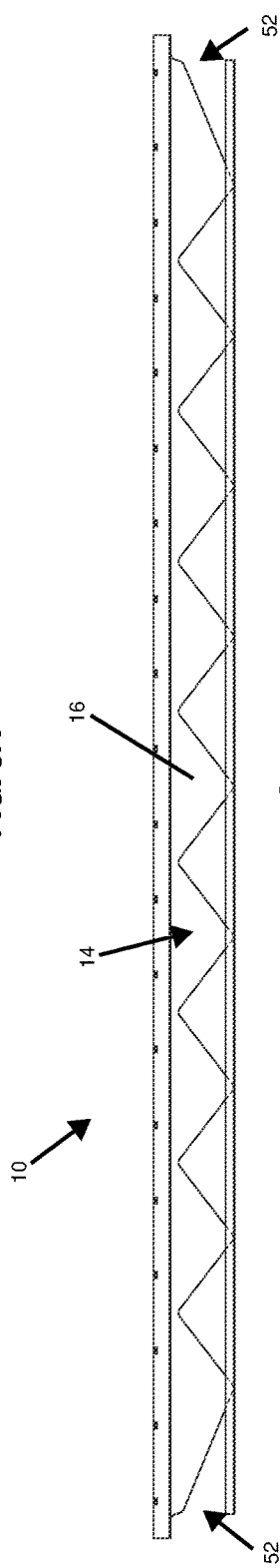
FIG. 5B shows an elevation view of the composite open web beam-joist, illustrating the open web layout according to another embodiment of the present disclosed technology.
Figure 5C:
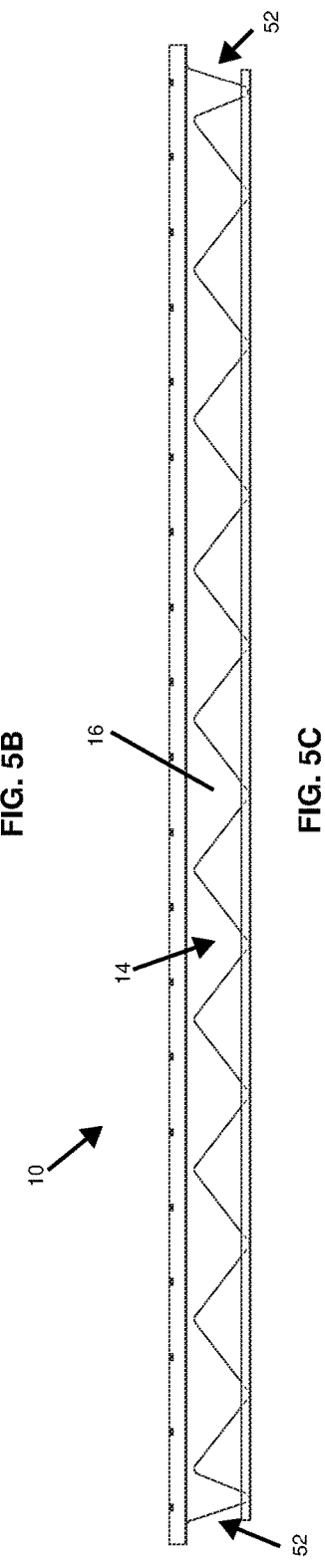
FIG. 5C shows an elevation view of the composite open web beam-joist, illustrating the open web layout according to yet another embodiment of the present disclosed technology.
Figure 5D:
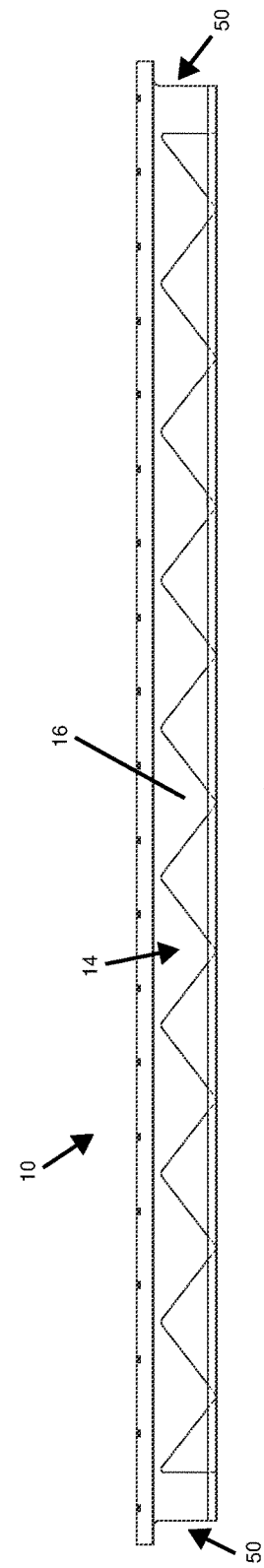
FIG. 5D shows an elevation view of the composite open web beam-joist, illustrating the open web layout according to an alternative embodiment of the present disclosed technology.
Figure 6A:
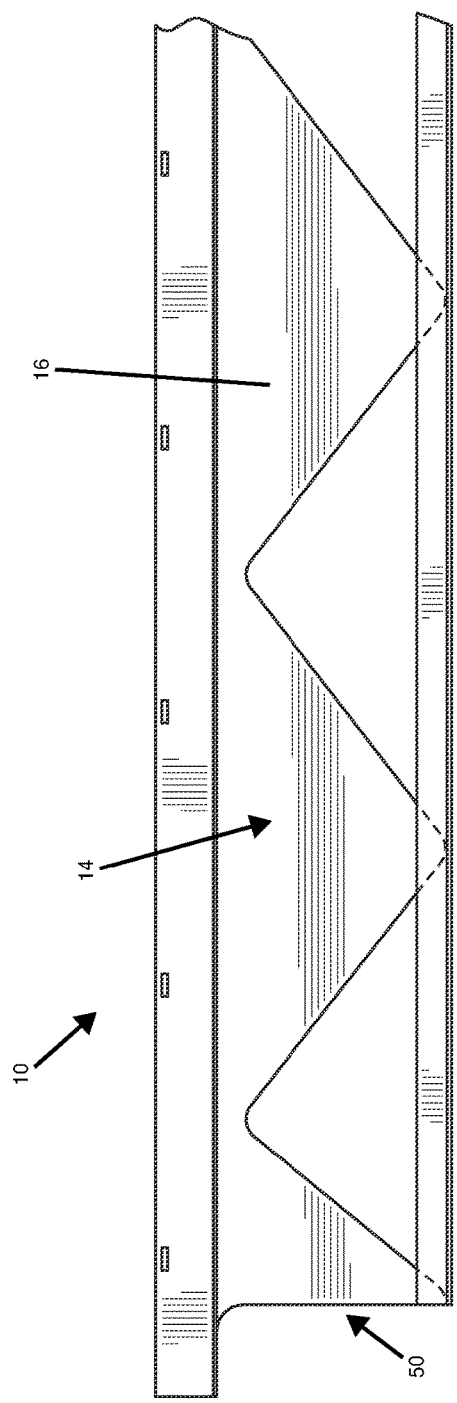
FIG. 6A shows a close-up view of the composite open web beam-joist of FIG. 5A according to one embodiment of the present disclosed technology.
Figure 6B:
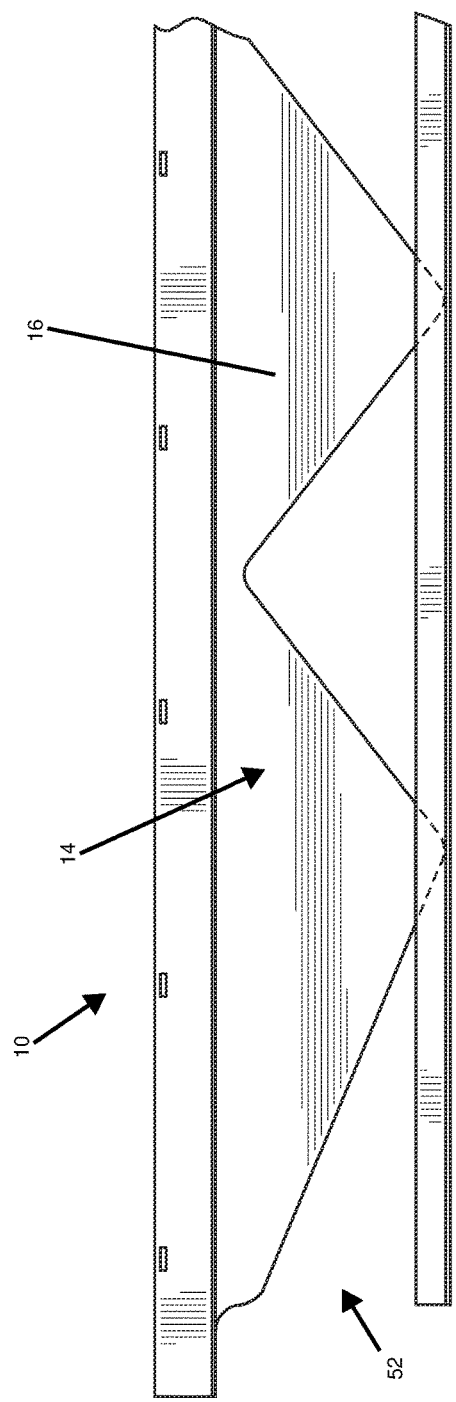
FIG. 6B shows a close-up view of the composite open web beam-joist of FIG. 5B according to one embodiment of the present disclosed technology.

Referring now to FIG. 5A-FIG. 6D, simultaneously, FIG. 5A FIG. 5A shows an elevation view of the composite open web beam-joist, illustrating the open web layout according to one embodiment of the present disclosed technology. FIG. 5B shows an elevation view of the composite open web beam-joist, illustrating the open web layout according to another embodiment of the present disclosed technology. FIG. 5C shows an elevation view of the composite open web beam-joist, illustrating the open web layout according to yet another embodiment of the present disclosed technology. FIG. 5D shows an elevation view of the composite open web beam-joist, illustrating the open web layout according to an alternative embodiment of the present disclosed technology. FIG. 6A shows a close-up view of the composite open web beam-joist of FIG. 5A according to one embodiment of the present disclosed technology. FIG. 6B shows a close-up view of the composite open web beam-joist of FIG. 5B according to one embodiment of the present disclosed technology. FIG. 6C shows a close-up view of the composite open web beam-joist of FIG. 5C according to one embodiment of the present disclosed technology. FIG. 6D shows a close-up view of the composite open web beam-joist of FIG. 5D according to one embodiment of the present disclosed technology.

In embodiments, the pattern or cut of the open web layout 14 may vary from composite open web beam joist 10 to composite open-web beam-joist 10 depending on the cut or arrangement of triangular web sections 16. For example, in certain embodiments, the open web layout 14 may include closed ends 50 as shown in FIG. 5A and 5D, although the thickness of the closed ends 50 may differ from web layout to web layout. In other embodiments, the open web layout 14 may include open ends 52 as shown in FIGS. 5B and 5C, although the size of the openings of the open ends 52 may be different from web layout to web layout.

Figure 7A:
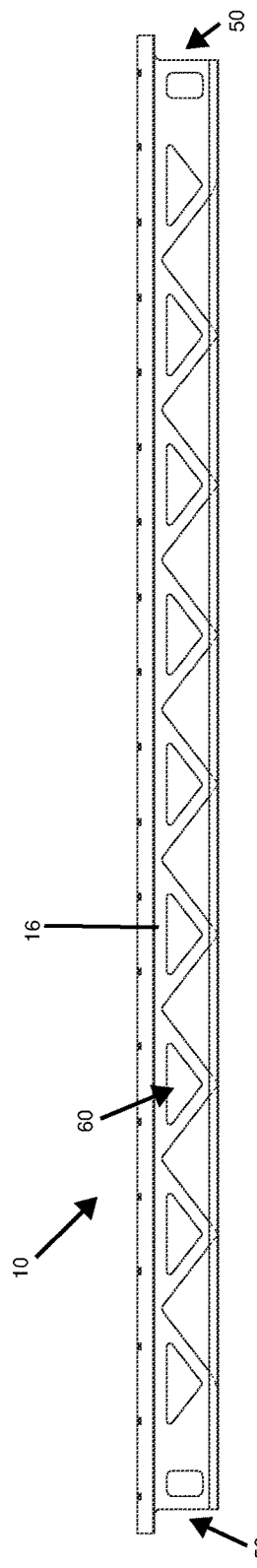
FIG. 7A shows an elevation view of the composite open web beam-joist, illustrating the cut-outs within an open web layout according to one embodiment of the present disclosed technology.
Figure 7B:
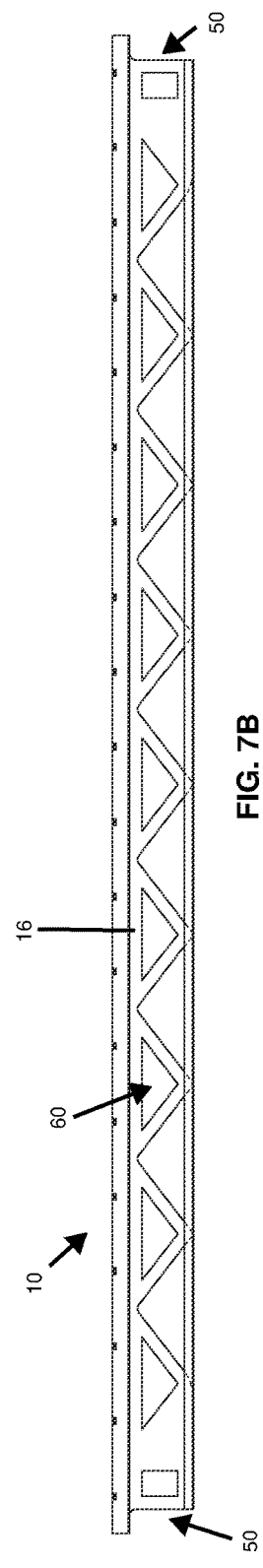
FIG. 7B shows an elevation view of the composite open web beam-joist, illustrating the cut-outs within an open web layout according to another embodiment of the present disclosed technology.
Figure 7C:
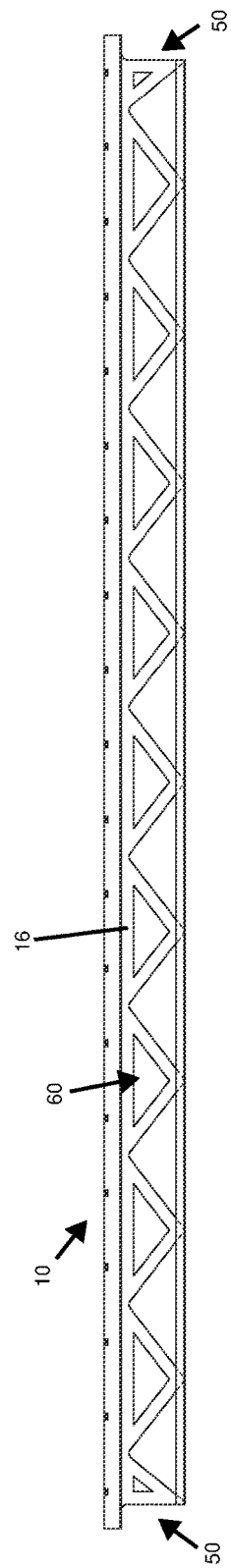
FIG. 7C shows an elevation view of the composite open web beam-joist, illustrating the cut-outs within an open web layout according to yet another embodiment of the present disclosed technology.
Figure 7D:
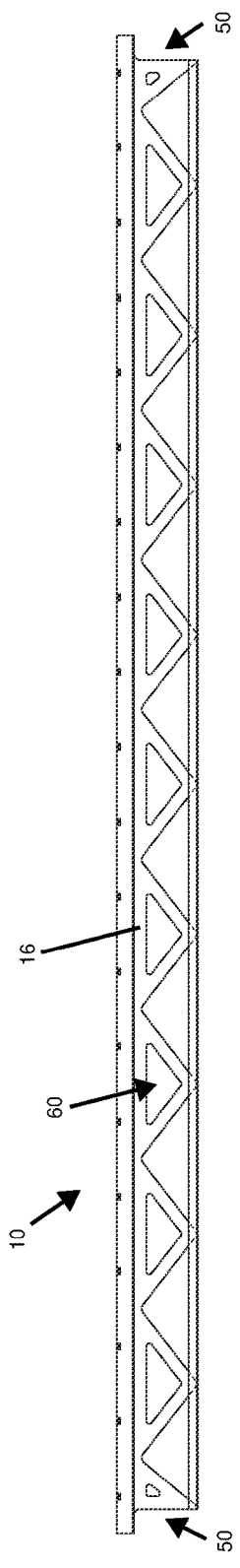
FIG. 7D shows an elevation view of the composite open web beam-joist, illustrating the cut-outs within an open web layout according to an alternative embodiment of the present disclosed technology.
Figure 8A:
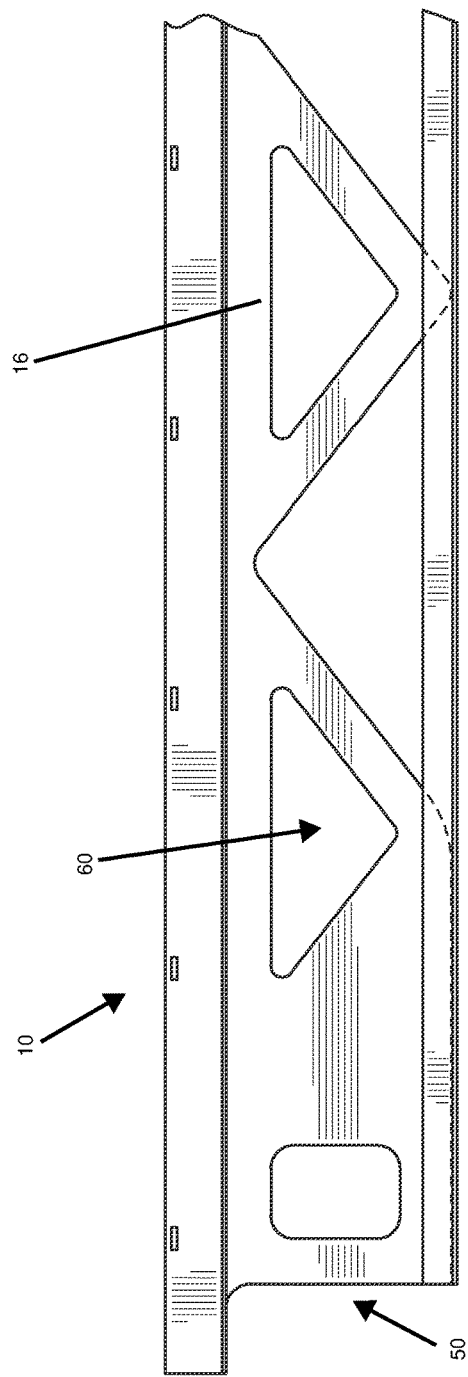
FIG. 8A shows a close-up view of the composite open web beam-joist of FIG. 7A according to one embodiment of the present disclosed technology.
Figure 8B:
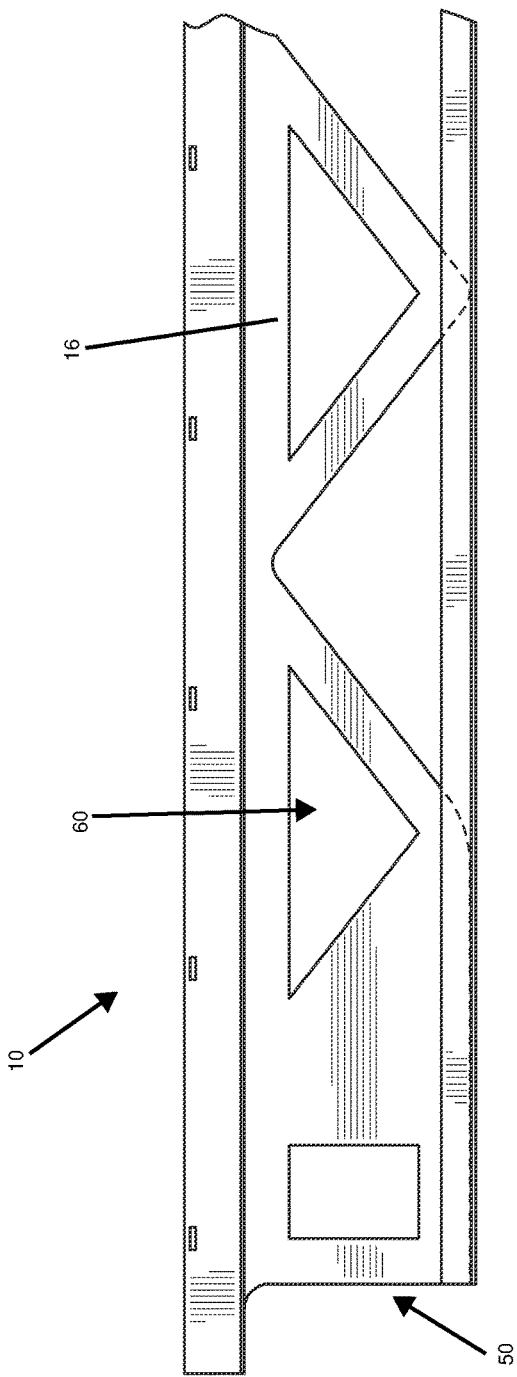
FIG. 8B shows a close-up view of the composite open web beam-joist of FIG. 7B according to one embodiment of the present disclosed technology.
Figure 8C:
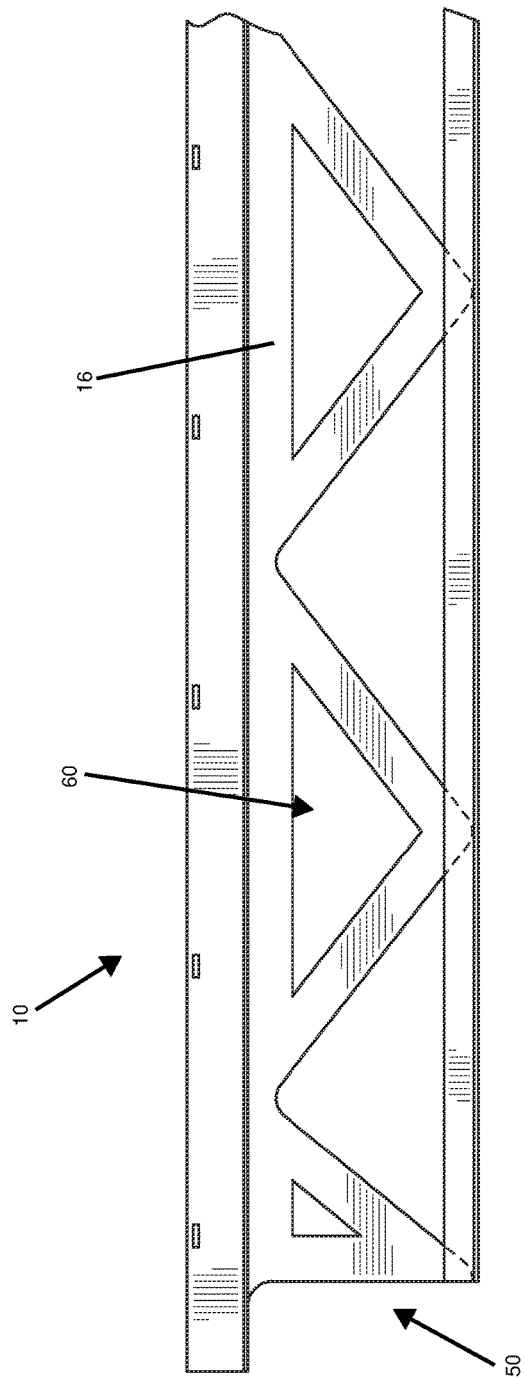
FIG. 8C shows a close-up view of the composite open web beam-joist of FIG. 7C according to one embodiment of the present disclosed technology.
Figure 8D:
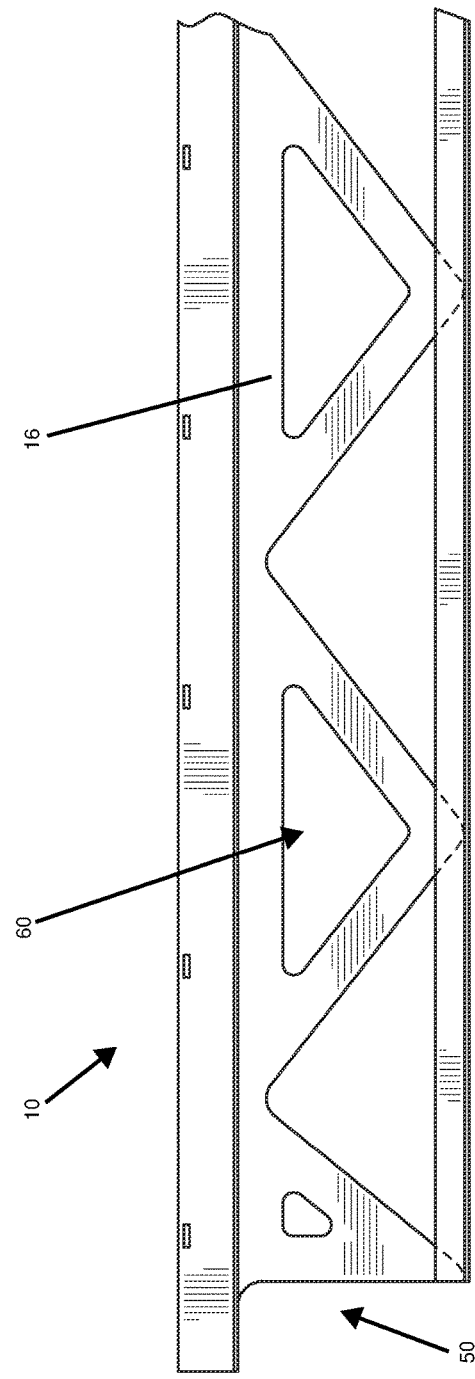
FIG. 8D shows a close-up view of the composite open web beam-joist of FIG. 7D according to one embodiment of the present disclosed technology.
Figure 9A:
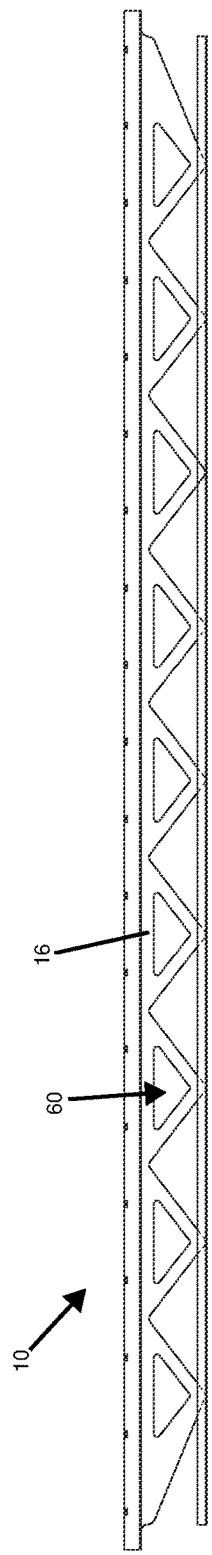
FIG. 9A shows an elevation view of the composite open web beam-joist, illustrating the cut-outs within an open web layout according to one embodiment of the present disclosed technology.
Figure 9B:
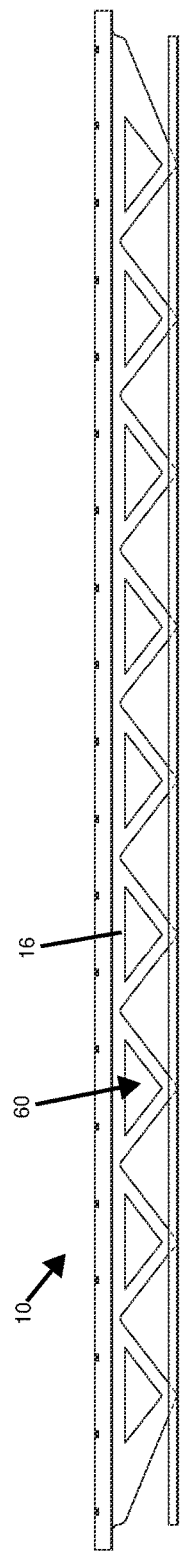
FIG. 9B shows an elevation view of the composite open web beam-joist, illustrating the cut-outs within an open web layout according to another embodiment of the present disclosed technology.
Figure 9C:
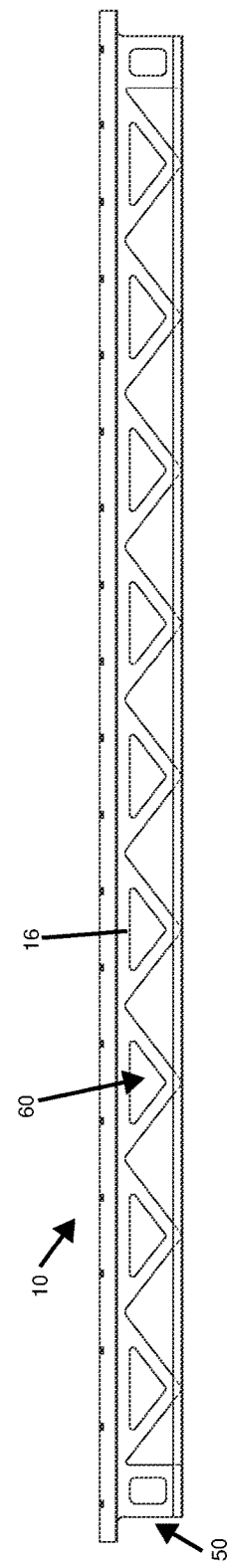
FIG. 9C shows an elevation view of the composite open web beam-joist, illustrating the cut-outs within an open web layout according to yet another embodiment of the present disclosed technology.
Figure 9D:
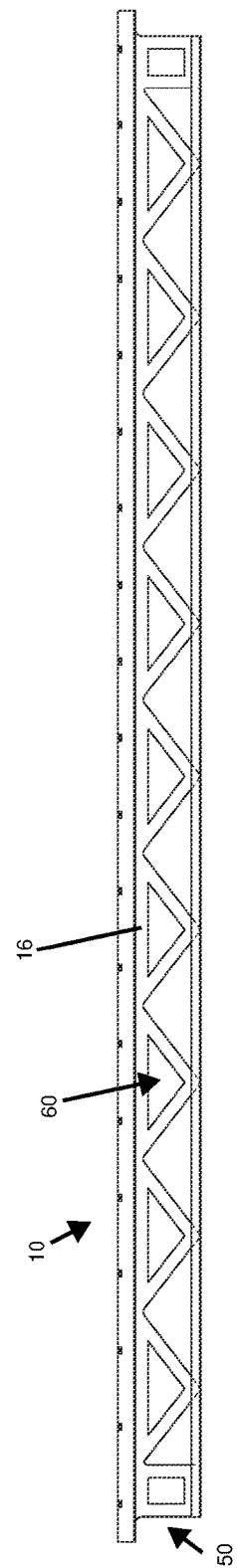
FIG. 9D shows an elevation view of the composite open web beam-joist, illustrating the cut-outs within an open web layout according to an alternative embodiment of the present disclosed technology.
Figure 11A:
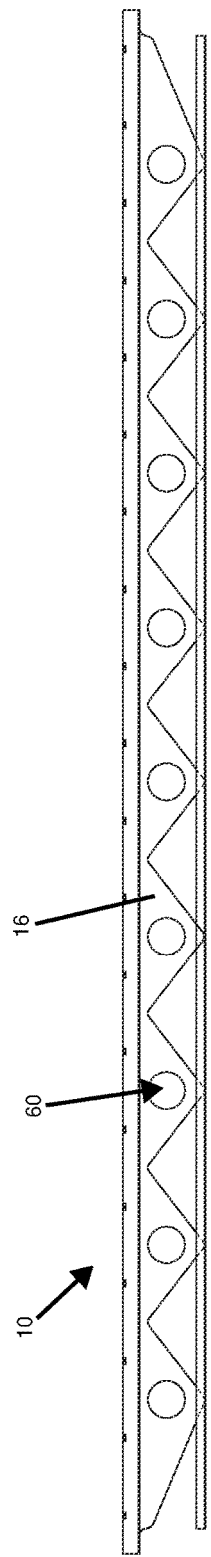
FIG. 11A shows an elevation view of the composite open web beam-joist, illustrating the cut-outs within an open web layout according to one embodiment of the present disclosed technology.
Figure 11B:
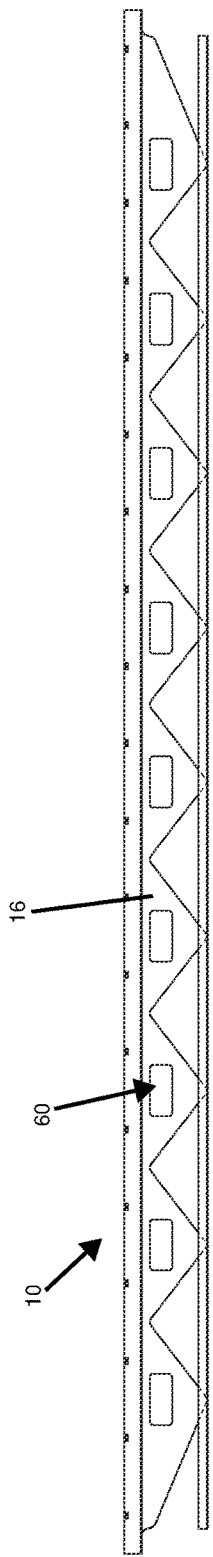
FIG. 11B shows an elevation view of the composite open web beam-joist, illustrating the cut-outs within an open web layout according to another embodiment of the present disclosed technology.
Figure 11C:
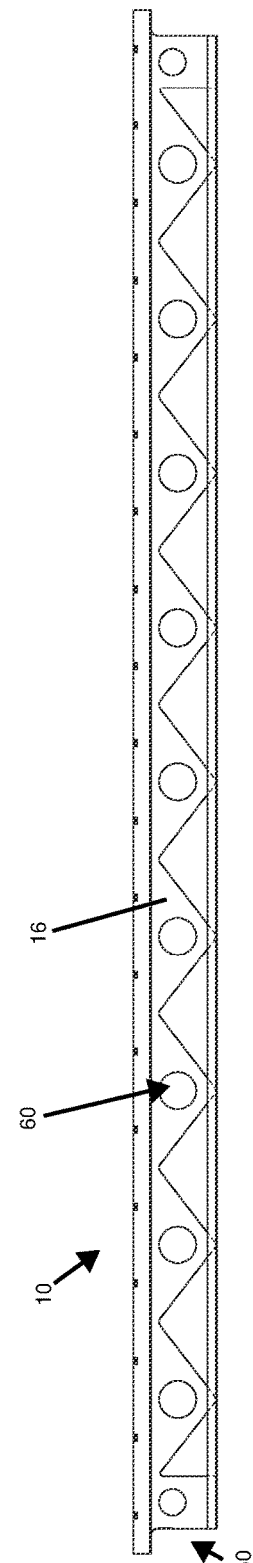
FIG. 11C shows an elevation view of the composite open web beam-joist, illustrating the cut-outs within an open web layout according to yet another embodiment of the present disclosed technology.
Figure 11D:
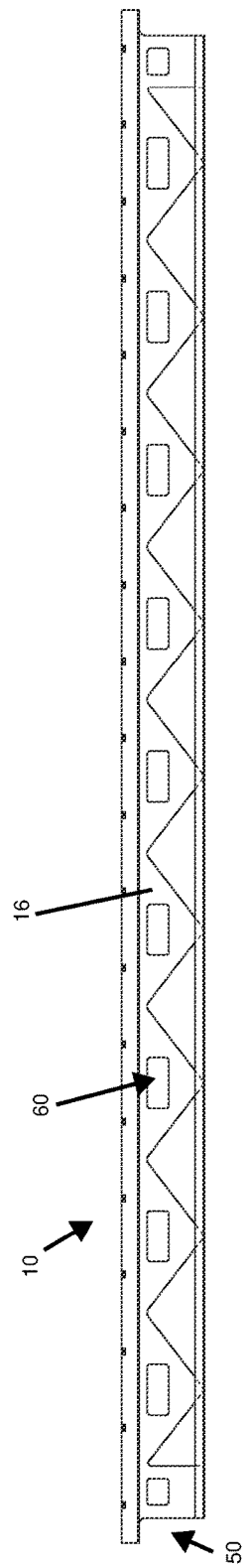
FIG. 11D shows an elevation view of the composite open web beam-joist, illustrating the cut-outs within an open web layout according to an alternative embodiment of the present disclosed technology.
Figure 14C:
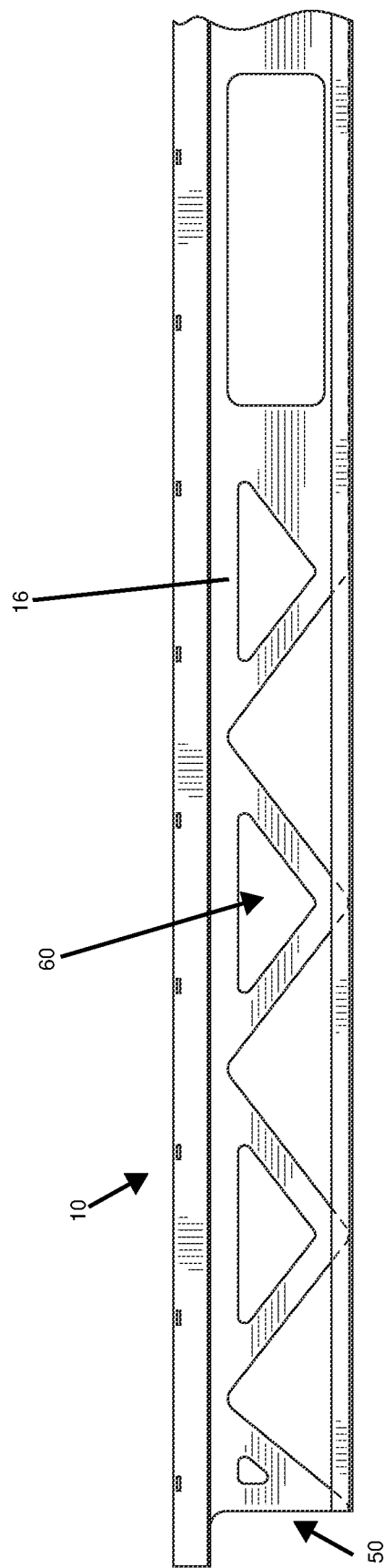
FIG. 14C shows a close-up view of the composite open web beam-joist of FIG. 13C according to one embodiment of the present disclosed technology.
Figure 14D:
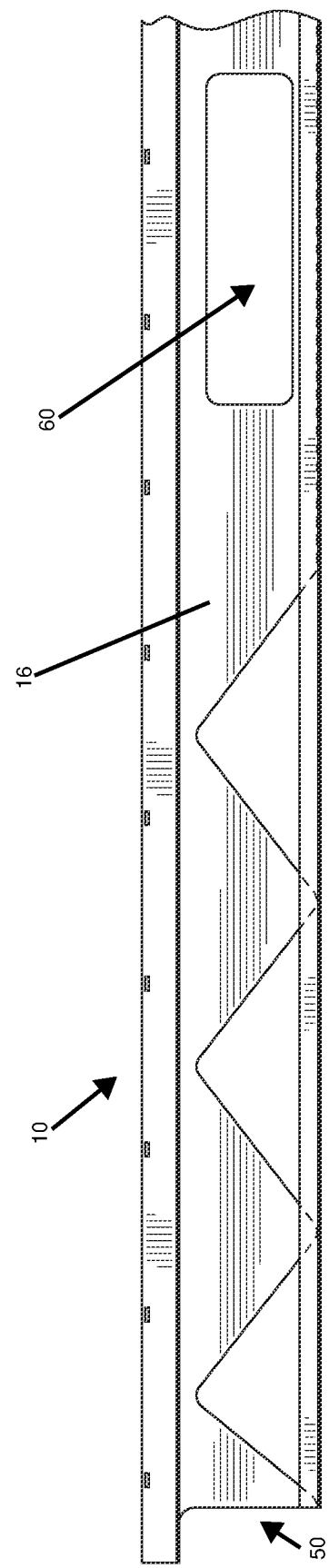
FIG. 14D shows a close-up view of the composite open web beam joist of FIG. 13D according to one embodiment of the present disclosed technology.

Referring now to FIG. 7A-FIG. 14D, simultaneously, FIG. 7A shows an elevation view of the composite open web beam-joist, illustrating the cut-outs within an open web layout according to one embodiment of the present disclosed technology. FIG. 7B shows an elevation view of the composite open web beam-joist, illustrating the cut-outs within an open web layout according to another embodiment of the present disclosed technology. FIG. 7C shows an elevation view of the composite open web beam-joist, illustrating the cut-outs within an open web layout according to yet another embodiment of the present disclosed technology. FIG. 7D shows an elevation view of the composite open web beam-joist, illustrating the cut-outs within an open web layout according to an alternative embodiment of the present disclosed technology. FIG. 8A shows a close-up view of the composite open web beam-joist of FIG. 7A according to one embodiment of the present disclosed technology. FIG. 8B shows a close-up view of the composite open web beam joist of FIG. 7B according to one embodiment of the present disclosed technology. FIG. 8C shows a close-up view of the composite open web beam joist of FIG. 7C according to one embodiment of the present disclosed technology. FIG. 8D shows a close-up view of the composite open web beam joist of FIG. 7D according to one embodiment of the present disclosed technology. FIG. 9A shows an elevation view of the composite open web beam-joist, illustrating the cut-outs within an open web layout according to one embodiment of the present disclosed technology. FIG. 9B shows an elevation view of the composite open web beam-joist, illustrating the cut-outs within an open web layout according to another embodiment of the present disclosed technology. FIG. 9C shows an elevation view of the composite open web beam-joist, illustrating the cut-outs within an open web layout according to yet another embodiment of the present disclosed technology. FIG. 9D shows an elevation view of the composite open web beam-joist, illustrating the cut-outs within an open web layout according to an alternative embodiment of the present disclosed technology. FIG. 10A shows a close-up view of the composite open web beam-joist of FIG. 9A according to one embodiment of the present disclosed technology. FIG. 10B shows a close-up view of the composite open web beam joist of FIG. 9B according to one embodiment of the present disclosed technology. FIG. 10C shows a close-up view of the composite open web beam-joist of FIG. 9C according to one embodiment of the present disclosed technology. FIG. 10D shows a close-up view of the composite open web beam-joist of FIG. 9D according to one embodiment of the present disclosed technology. FIG. 11A shows an elevation view of the composite open web beam-joist, illustrating the cut-outs within an open web layout according to one embodiment of the present disclosed technology. FIG. 11B shows an elevation view of the composite open web beam-joist, illustrating the cut-outs within an open web layout according to another embodiment of the present disclosed technology. FIG. 11C shows an elevation view of the composite open web beam-joist, illustrating the cut-outs within an open web layout according to yet another embodiment of the present disclosed technology. FIG. 11D shows an elevation view of the composite open web beam-joist, illustrating the cut-outs within an open web layout according to an alternative embodiment of the present disclosed technology. FIG. 12A shows a close-up view of the composite open web beam-joist of FIG. 11A according to one embodiment of the present disclosed technology. FIG. 12B shows a close-up view of the composite open web beam joist of FIG. 11B according to one embodiment of the present disclosed technology. FIG. 12C shows a close-up view of the composite open web beam joist of FIG. 11C according to one embodiment of the present disclosed technology. FIG. 12D shows a close-up view of the composite open web beam-joist of FIG. 11D according to one embodiment of the present disclosed technology. FIG. 13A shows an elevation view of the composite open web beam-joist, illustrating the cut-outs within an open web layout according to one embodiment of the present disclosed technology. FIG. 13B shows an elevation view of the composite open web beam-joist, illustrating the cut-outs within an open web layout according to another embodiment of the present disclosed technology. FIG. 13C shows an elevation view of the composite open web beam-joist, illustrating the cut-outs within an open web layout according to yet another embodiment of the present disclosed technology. FIG. 13D shows an elevation view of the composite open web beam-joist, illustrating the cut-outs within an open web layout according to an alternative embodiment of the present disclosed technology. FIG. 14A shows a close-up view of the composite open web beam-joist of FIG. 13A according to one embodiment of the present disclosed technology. FIG. 14B shows a close-up view of the composite open web beam-joist of FIG. 13B according to one embodiment of the present disclosed technology. FIG. 14C shows a close-up view of the composite open web beam joist of FIG. 13C according to one embodiment of the present disclosed technology. FIG. 14D shows a close-up view of the composite open web beam joist of FIG. 13D according to one embodiment of the present disclosed technology.

In embodiments, the closed ends 50 and/or the triangular web sections 16 includes cut-outs 60 for facilitating the installation of plumbing, electrical, and/or HVAC in a building as well as reducing the weight of the composite open web beam joists 10 while not compromising their structural integrity or strength. The cut-outs 60 may be triangular as shown in FIGS. 7A-10D, circular as shown in FIGS. 11A, 11C, 12A, 12C, 13B, and 14B, or rectangular as shown in FIGS. 11B, 11D, 12B, 12D, 13A, and 14A. The cut-outs may further range in size and position within the triangular web sections 16.

Figure 4A:
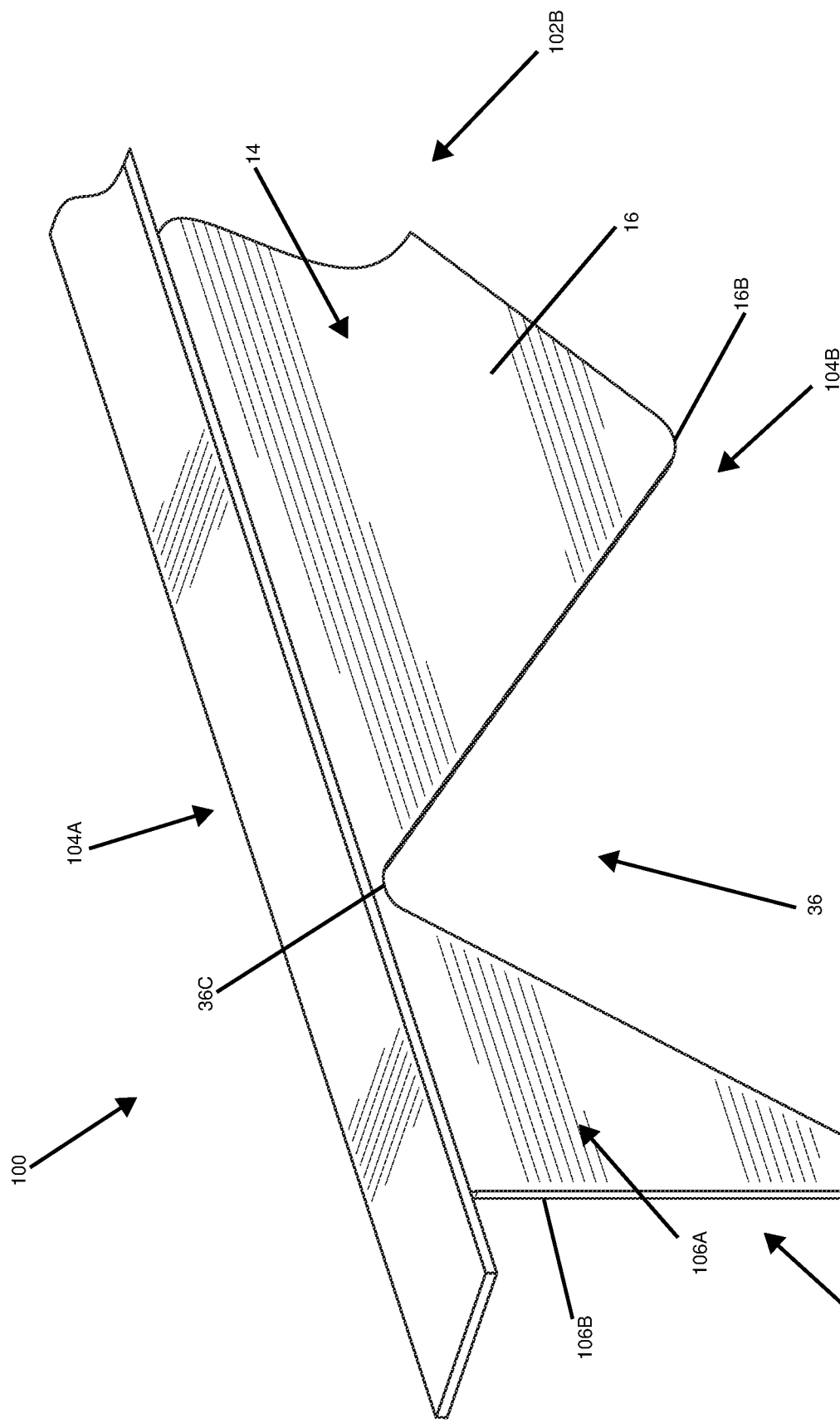
FIG. 4A shows a close-up view of a portion of the composite open web beam-joist, illustrating the beam-joist portion formed after cutting the beam according to one embodiment of the present disclosed technology.
Figure 4B:
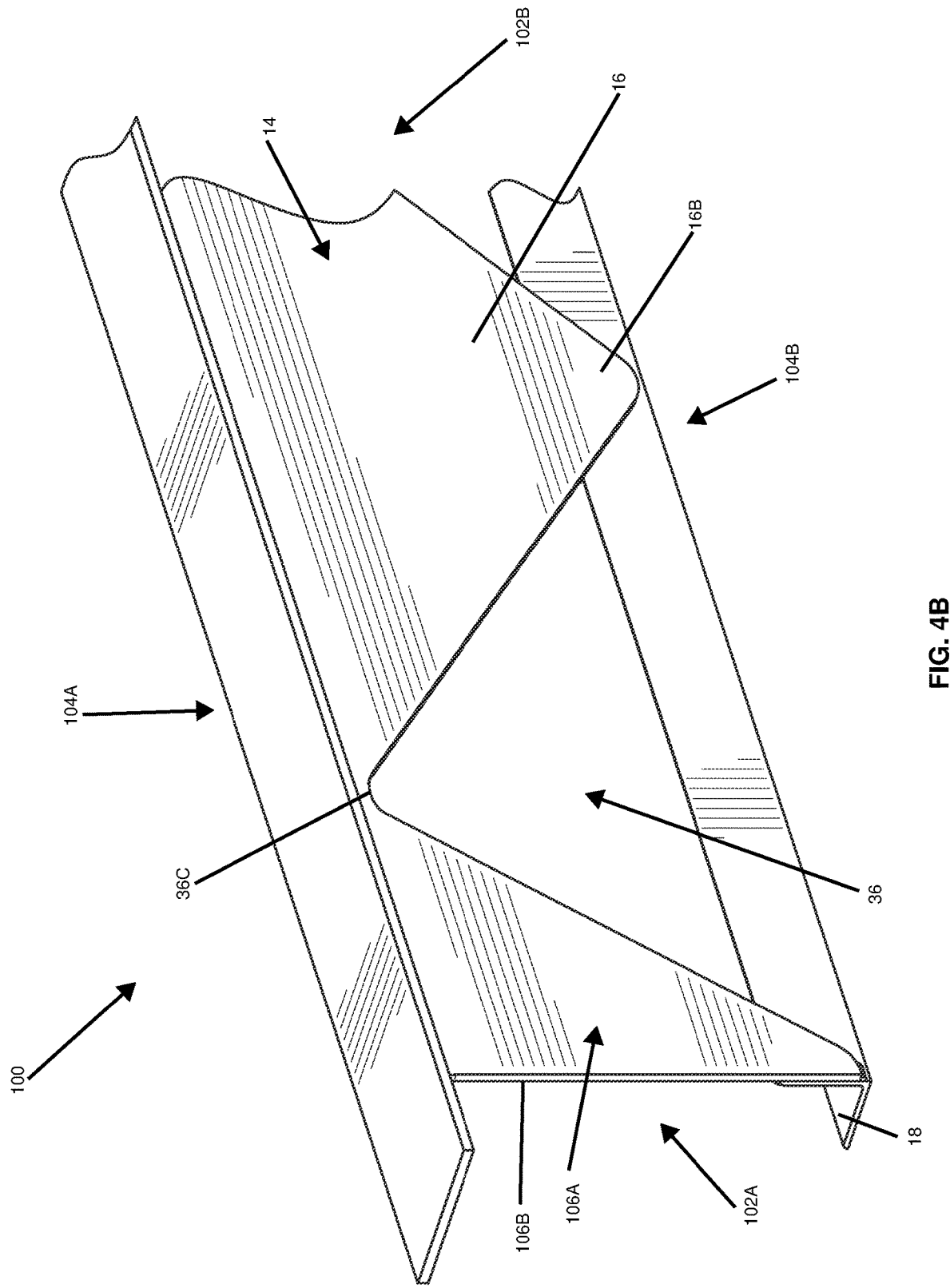
FIG. 4B a close-up view of a portion of the composite open web beam-joist, illustrating the cambered beam-joist portion formed after attaching the first chord angle beam to the first side of the cambered beam-joist portion according to one embodiment of the present disclosed technology.
Figure 4C:
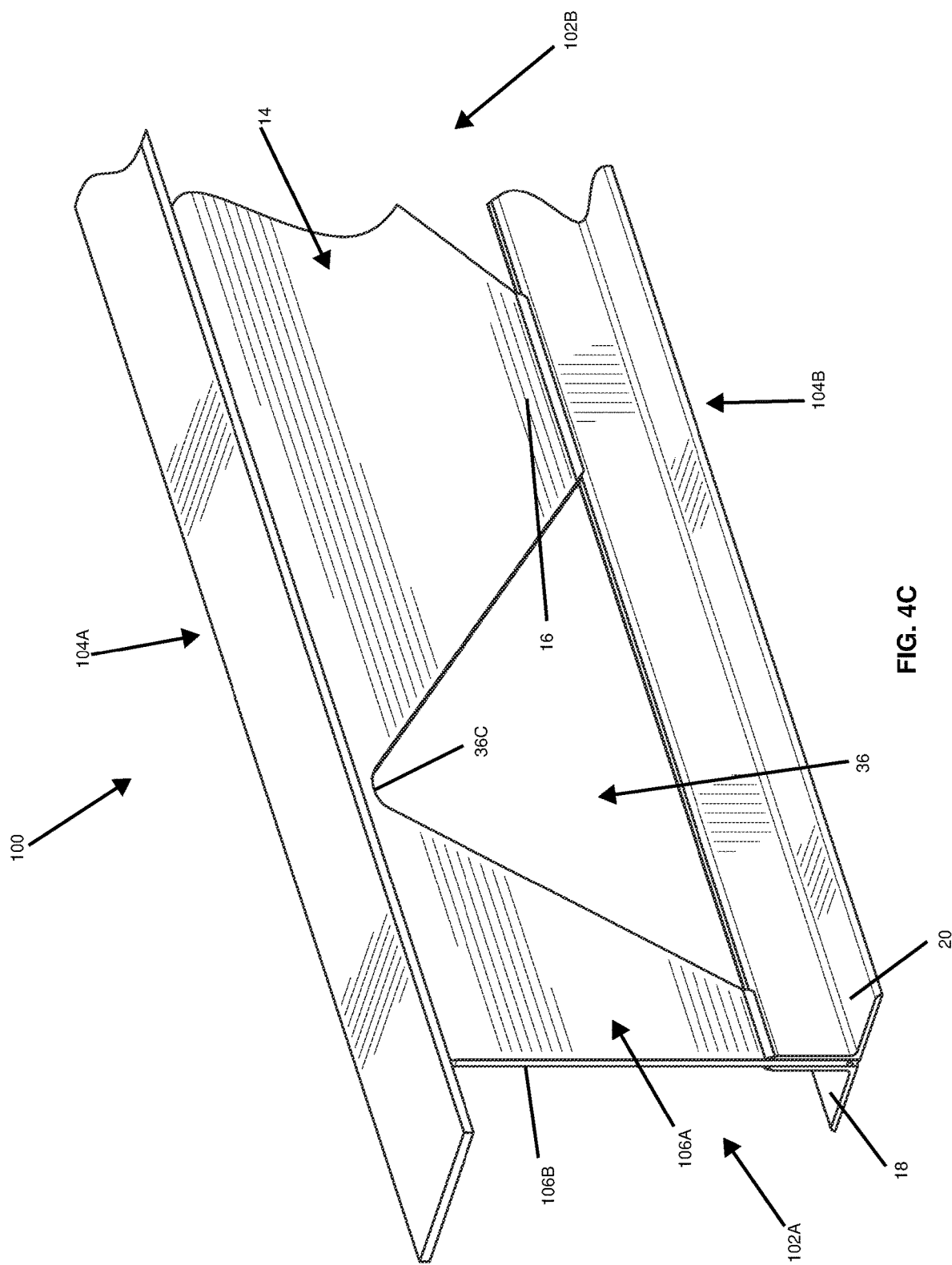
FIG. 4C a close-up view of a portion of the composite open web beam-joist, illustrating the cambered beam-joist portion formed attaching the second chord angle beam to the second side of the cambered beam-joist portion according to one embodiment of the present disclosed technology.
Figure 4D:
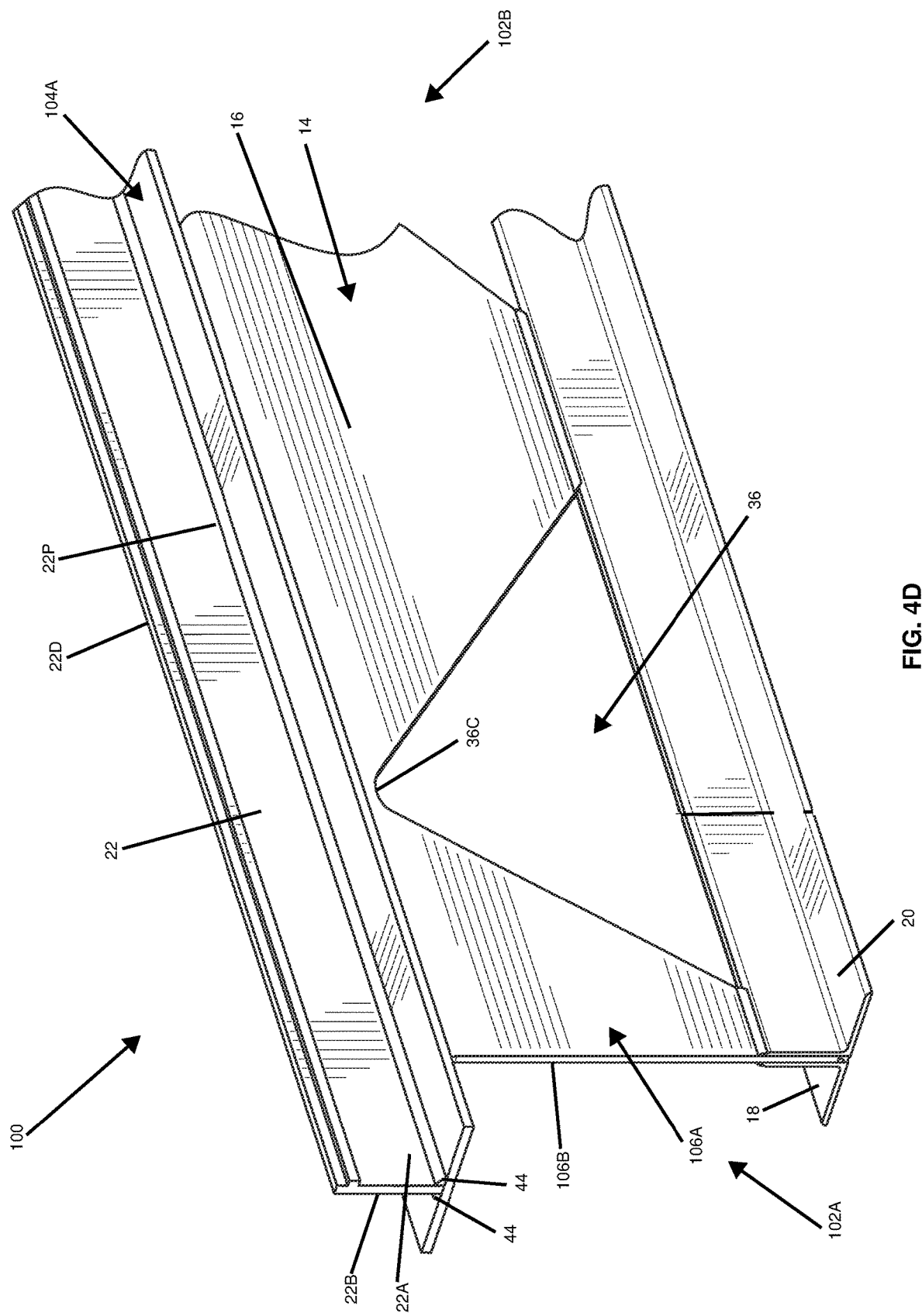
FIG. 4D a close-up view of a portion of the composite open web beam-joist, illustrating the composite open web beam-joist formed after attaching the plate vertically to the top end of the cambered beam-joist portion according to one embodiment of the present disclosed technology.

Referring now to FIGS. 4A-4D, simultaneously, FIG. 4A shows a close-up view of a portion of the composite open web beam-joist, illustrating the beam-joist portion formed after cutting the beam according to one embodiment of the present disclosed technology. FIG. 4B a close-up view of a portion of the composite open web beam-joist, illustrating the cambered beam-joist portion formed after attaching the first chord angle beam to the first side of the cambered beam-joist portion according to one embodiment of the present disclosed technology. FIG. 4C a close-up view of a portion of the composite open web beam-joist, illustrating the cambered beam-joist portion formed attaching the second chord angle beam to the second side of the cambered beam joist portion according to one embodiment of the present disclosed technology. FIG. 4D a close-up view of a portion of the composite open web beam-joist, illustrating the composite open web beam-joist formed after attaching the plate vertically to the top end of the cambered beam-joist portion according to one embodiment of the present disclosed technology.

The method of manufacturing the composite open web beam joists comprises securing a metal beam having a closed uniform web layout to a fastening table or guide table to secure the beam in position. Next, the method comprises cutting the metal beam longitudinally along the closed uniform web layout to form a beam joist portion 100 including a first end 102A, a second end 102B opposite the first end 102A, a top end 104A, a bottom end 104B opposite the top end 104A, a first side 106A, a second side 106B opposite the first side 106A, and the open web layout 14 as shown in FIG. 4A. The open web layout 14 extends between the first end 102A and the second end 102B and includes an undulating shape formed of the plurality of triangular web sections 16 and the openings 36 positioned between each of the triangular web sections 16. Each of the triangular web sections 16 extends between the top end 104A and the bottom end 104B and includes the base 16A, which is disposed at the top end 104A, and the peak 16B, which is disposed at the bottom end 104B. In embodiments, the metal beam is cut such that the center 36 of one of the openings 36 is substantially 24 inches away from the center 36 of an adjacent opening 36. The metal beam may comprise an I-beam, a T-bar beam, a wide-flange beam, or the like.

Next, the method comprises cambering the beam joist portion 100 to bend the beam-joist portion 100 along a vertical plane thereof to form a cambered beam-joist portion 100. In embodiments, the camber can be set to the designation pattern of a 1" camber on 40', and ½" on 20'.

Next, the method comprises attaching the first chord angle beam 18 to the first side of the cambered beam-joist portion 100 at the peaks 16B of the triangular web sections 16 as shown in FIG. 4B. In embodiments, the first chord angle beam 18 is attached to the first side 106A of the cambered beam-joist portion 100 at the peaks 16B of the triangular web sections 16 such that the first chord angle beam 18 is equidistant from a center of all the triangular web sections 16. In other words, each attachment point of the first chord angle beam 18 to the peaks 16B of the triangular web sections 16 is equidistant to a center of the respective triangular web section 16 to which the first chord angle beam 18 is attached. The first chord angle beam 18 is attached to the peaks 16B of the triangular web sections 16 via welding.

Next, the method comprises attaching the second chord angle beam 20 to the second side of the cambered beam-joist portion 100 at the peaks 16B of the triangular web sections 16 as shown in FIG. 4C. In embodiments, the second chord angle beam 20 is attached to the second side 106B of the cambered beam-joist portion 100 at the peaks 16B of the triangular web sections 16 such that the first chord angle beam 18 is equidistant from a center of all the triangular web sections 16. In other words, each attachment point of the second chord angle beam 20 to the peaks 16B of the triangular web sections 16 is equidistant to a center of the respective triangular web section 16 to which the second chord angle beam 20 is attached. The second chord angle beam 20 is attached to the peaks 16B of the triangular web sections 16 via welding.

Next, in embodiments, the method comprises attaching the first chord angle beam 18 and the second chord angle beam 20 to each other. In some embodiments, they're attached to each other via welding.

Lastly, the method comprises vertically attaching the vertical plate 22 to a center of the top end 104A of the cambered beam joist portion such that the plate extends longitudinally along the top end 104A of the cambered beam-joist portion 100 between the first end 102A and the second end 102B of the cambered beam joist portion 100, as shown in FIG. 4D. In embodiments, the plate 22 is attached by welding the substantially 12-inch-long continuous welds 44 on the first side 22A of the plate 22 and the second side 22B of the plate 22B at the juncture where the proximal end 22P of the plate 22 meets the top end 104A of the cambered beam-joist portion 100. In some embodiments, the 12-inch-long continuous welds 44 are made at the first end 102A and the second end 102B of the cambered beam-joist portion 100.

In other embodiments, the plate 22 is further welded to the center of the top end of the cambered beam-joist portion by welding substantially 2-inch-long continuous welds on the first side 22A of the plate 22 and the second side 22B of the plate 22 at the juncture where the proximal end 22P of the plate 22 meets the top end 104A of the cambered beam-joist portion 100. In some embodiments, the 2-inch-long continuous welds are staggered 12 inches apart on the first side 22A and the second side 22B of the plate. The 12-inch-long continuous welds and the 2-inch-long continuous welded to a thickness of at least 3/16 inches.

Any device or step to a method described in this disclosure can comprise or consist of that which it is a part of, or the parts which make up the device or step. The term "and/or" is inclusive of the items which it joins linguistically and each item by itself.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

What is claimed is:

1. A method of manufacturing a composite open web beam-joist from a metal beam having a closed uniform web layout, comprising:

cutting the metal beam longitudinally along the closed uniform web layout to form a beam-joist portion including a first end, a second end opposite the first end, a top end, a bottom end opposite the top end, a first side, a second side opposite the first side, and an open web layout extending between the first end and the second end, the open web layout including a plurality of triangular web sections extending between the top end and the bottom end and an opening between the triangular web sections, each of the triangular web sections including a base disposed at the top end and an ovoid peak disposed at the bottom end;

cambering the beam-joist portion to bend the beam-joist portion along a horizontal plane thereof to form a cambered beam-joist portion;

welding a first metal chord angle beam to the first side of the cambered beam-joist portion at the ovoid peaks of the triangular web sections;

welding a second metal chord angle beam to the second side of the cambered beam-joist portion at the ovoid peaks of the triangular web sections; and attaching a flat and planar plate vertically to the top end of the cambered beam-joist portion such that the flat and planar plate extends longitudinally along the top end of the cambered beam-joist portion between the first end and the second end of the cambered beam-joist portion, the flat and planar plate including a first side, a second side opposite the first side, a distal end, and a proximal end opposite the distal end, the first side including a flange at the distal end, the second side including a recess at the distal end.

2. The method of claim 1, further comprising attaching the first metal chord angle beam and the second metal chord angle beam to each other, wherein the first metal chord angle beam and the second metal chord angle beam are each L-shaped metal beams.

3. The method of claim 1, further comprising securing the beam on a table prior to cutting the beam to ensure stability of the beam while cutting.

4. The method of claim 1, wherein the beam is cut such that the openings of the open web layout each include a center that is substantially 24 inches from a center of an adjacent opening.

5. The method of claim 1, wherein the first metal chord angle beam is attached to the first side of the cambered beam-joist portion at the ovoid peaks of the triangular web sections such that the first metal chord angle beam is equidistant from a center of all the triangular web sections.

6. The method of claim 5, wherein the second metal chord angle beam is attached to the second side of the cambered beam-joist portion at the ovoid peaks of the triangular web sections such that the second metal chord angle beam mirrors the first chord angle beam and is equidistant from a center of all the triangular web sections.

7. The method of claim 1, wherein the flat and planar plate is vertically attached to a center of the top end of the cambered beam-joist portion via welding.

8. The method of claim 7, wherein the flat and planar plate is welded by welding substantially 12-inch-long continuous welds on the first side of the flat and planar plate and the second side of the flat and planar plate at a juncture where the proximal end of the flat and planar plate meets the top end of the cambered beam-joist portion.

9. The method of claim 8, wherein the substantially 12-inch-long continuous welds are made at the first end and the second end of the cambered beam-joist portion.

10. The method of claim 9, wherein:

the flat and planar plate is further welded to the center of the top end of the cambered beam-joist portion by welding substantially 2-inch-long continuous welds on the first side of the flat and planar plate and the second side of the flat and planar plate at the juncture where the proximal end of the flat and planar plate meets the top end of the cambered beam-joist portion;

the substantially 2-inch-long continuous welds on the first side of the flat and planar plate and the second side of the flat and planar plate at the juncture where the proximal end of the flat and planar plate meets the top end of the cambered beam-joist portion are staggered 12 inches apart on the first side and the second side of the flat and planar plate; and wherein each of the substantially 12-inch-long continuous welds on the first side of the flat and planar plate and the second side of the flat and planar plate at a juncture where the proximal end of the flat and planar plate meets the top end of the cambered beam-joist portion and the substantially 2-inch-long continuous welds on the first side of the flat and planar plate and the second side of the flat and planar plate at the juncture where the proximal end of the flat and planar plate meets the top end of the cambered beam-joist portion comprise a thickness of $3/16$ inches.

* * * * *